(12) United States Patent
Matsumoto et al.

(10) Patent No.: US 8,737,682 B2
(45) Date of Patent: May 27, 2014

(54) PIPE THICKNESS MEASURING DEVICE AND METHOD, AND RECORDING MEDIUM

(71) Applicant: FUJIFILM Corporation, Tokyo (JP)

(72) Inventors: Yoshikazu Matsumoto, Tokyo (JP); Makiko Nagashima, Tokyo (JP); Kouji Yamaguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/773,523

(22) Filed: Feb. 21, 2013

(65) Prior Publication Data

US 2013/0163809 A1    Jun. 27, 2013

Related U.S. Application Data

(63) Continuation of application No. PCT/JP2011/068118, filed on Aug. 9, 2011.

(30) Foreign Application Priority Data

Aug. 26, 2010    (JP) ................................ 2010-189518

(51) Int. Cl.
*G06K 9/00*    (2006.01)

(52) U.S. Cl.
USPC ........................................................ 382/100

(58) Field of Classification Search
USPC ............ 378/50, 54, 59, 89; 382/100; 702/172
See application file for complete search history.

(56) References Cited

U.S. PATENT DOCUMENTS

| 4,330,835 A |   | 5/1982 | Gehm |
|---|---|---|---|
| 4,695,729 A |   | 9/1987 | Monno et al. |
| 6,377,654 B1 | * | 4/2002 | Willems et al. ................. 378/59 |
| 7,272,241 B2 | * | 9/2007 | Demi et al. .................... 382/103 |

FOREIGN PATENT DOCUMENTS

| EP | 0 009 292 A1 | 4/1980 |
|---|---|---|
| EP | 1 072 861 A1 | 1/2001 |
| JP | 54-114263 A | 9/1979 |
| JP | 55-043499 A | 3/1980 |
| JP | 60-260807 A | 12/1985 |
| JP | 2001-4352 A | 1/2001 |
| JP | 2005-257610 A | 9/2005 |
| JP | 2008-058139 A | 3/2008 |
| JP | 2008-185359 A | 8/2008 |
| JP | 2009-36708 A | 2/2009 |

OTHER PUBLICATIONS

International Search Report in PCT/JP2011/068118 dated Sep. 6, 2011.
Japanese Notification of Reasons for Rejection dated Jan. 6, 2014, with partial English Translation.
Extended European Search Report dated Dec. 20, 2013.

* cited by examiner

*Primary Examiner* — Gregory F Cunningham
(74) *Attorney, Agent, or Firm* — McGinn IP Law Group, PLLC

(57) ABSTRACT

A pipe thickness measuring device 10 is provided, including a luminance profile obtaining unit obtaining luminance profiles of radiographic images of a pipe to be measured in a direction crossing the pipe, an outer diameter point detecting unit detecting outer diameter points of the pipe based on the obtained luminance profiles, a region setting unit setting a predetermined region inside two of the outer diameter points of the pipe detected by the outer diameter point detecting unit, and an inner diameter point detecting unit detecting inner diameter points of the pipe based on a luminance profile corresponding to the set predetermined region from among the luminance profiles obtained by the luminance profile obtaining unit.

15 Claims, 23 Drawing Sheets

EVALUATION IMAGE 0

EVALUATION IMAGE 1

EVALUATION IMAGE 2

EVALUATION IMAGE 3

FIG.15

| NAME | IMAGE | REGION NUMBER | REMARKS |
|---|---|---|---|
| IMAGE 0/THICK/LEFT END | EVALUATION IMAGE 0 | (1) | LEFT END OF THICK PIPE |
| IMAGE 0/THICK/RIGHT END | | (2) | RIGHT END OF THICK PIPE |
| IMAGE 0/THIN/LEFT END | | (3) | LEFT END OF THIN PIPE |
| IMAGE 0/THIN/RIGHT END | | (4) | RIGHT END OF THIN PIPE |
| IMAGE 0/LARGE MEASUREMENT REGION | | (5) | LARGE MEASUREMENT REGION |
| IMAGE 1/GENTLE INCLINATION | EVALUATION IMAGE 1 | (6) | GENTLE INCLINATION |
| IMAGE 2/STEEP INCLINATION | EVALUATION IMAGE 2 | (7) | STEEP INCLINATION |
| IMAGE 3/WAVY OUTER WALL/NOISY | EVALUATION IMAGE 3 | (8) | WAVY OUTER WALL/NOISY |

FIG.16

LINE-SEGMENT DESIGNATION DEPENDENCY EVALUATION SCHEMATIC VIEW

FIG.17

| | EVALUATION IMAGE 0/THICK/LEFT END | | | | | |
|---|---|---|---|---|---|---|
| | GLOBAL ESTIMATION ONLY | | | GLOBAL ESTIMATION + LOCAL ESTIMATION | | |
| | OUTER DIAMETER POINT | INNER DIAMETER POINT | THICKNESS (PIXEL) | OUTER DIAMETER POINT | INNER DIAMETER POINT | THICKNESS (PIXEL) |
| -20 | 38.32 | 127.00 | 88.68 | 37.80 | 127.00 | 89.20 |
| -18 | 38.39 | 127.00 | 88.61 | 37.92 | 127.00 | 89.08 |
| -16 | 37.60 | 126.00 | 88.40 | 37.06 | 126.00 | 88.94 |
| -14 | 37.63 | 127.00 | 89.37 | 37.12 | 127.00 | 89.88 |
| -12 | 37.65 | 126.00 | 88.35 | 37.25 | 126.00 | 88.75 |
| -10 | 37.71 | 126.00 | 88.29 | 37.51 | 126.00 | 88.49 |
| -8 | 37.67 | 126.00 | 88.33 | 37.47 | 126.00 | 88.53 |
| -6 | 37.69 | 126.00 | 88.31 | 37.51 | 126.00 | 88.49 |
| -4 | 37.67 | 125.00 | 87.33 | 37.27 | 125.00 | 87.73 |
| -2 | 37.74 | 126.00 | 88.26 | 37.54 | 126.00 | 88.46 |
| 0 | 37.67 | 125.00 | 87.33 | 37.28 | 125.00 | 87.72 |
| 2 | 37.67 | 126.00 | 88.33 | 37.28 | 126.00 | 88.72 |
| 4 | 37.63 | 126.00 | 88.37 | 37.21 | 126.00 | 88.79 |
| 6 | 37.63 | 126.00 | 88.37 | 37.23 | 126.00 | 88.77 |
| 8 | 37.64 | 126.00 | 88.36 | 37.13 | 126.00 | 88.87 |
| 10 | 37.65 | 126.00 | 88.35 | 37.24 | 126.00 | 88.76 |
| 12 | 37.58 | 126.00 | 88.42 | 37.06 | 126.00 | 88.94 |
| 14 | 37.61 | 126.00 | 88.39 | 37.07 | 126.00 | 88.93 |
| 16 | 37.49 | 126.00 | 88.51 | 36.93 | 126.00 | 89.07 |
| 18 | 38.37 | 127.00 | 88.63 | 37.82 | 127.00 | 89.18 |
| 20 | 38.29 | 127.00 | 88.71 | 37.78 | 127.00 | 89.22 |

FIG.18

| | EVALUATION IMAGE 0/THICK/RIGHT END ||||||
| | GLOBAL ESTIMATION ONLY ||| GLOBAL ESTIMATION + LOCAL ESTIMATION |||
| | OUTER DIAMETER POINT | INNER DIAMETER POINT | THICKNESS (PIXEL) | OUTER DIAMETER POINT | INNER DIAMETER POINT | THICKNESS (PIXEL) |
|---|---|---|---|---|---|---|
| -20 | 259.63 | 168.00 | 91.63 | 260.11 | 168.00 | 92.11 |
| -18 | 259.61 | 168.00 | 91.61 | 260.16 | 168.00 | 92.16 |
| -16 | 259.36 | 167.00 | 92.36 | 259.73 | 167.00 | 92.73 |
| -14 | 259.35 | 167.00 | 92.35 | 259.43 | 167.00 | 92.43 |
| -12 | 259.33 | 167.00 | 92.33 | 259.77 | 167.00 | 92.77 |
| -10 | 259.29 | 168.00 | 91.29 | 259.73 | 168.00 | 91.73 |
| -8 | 259.31 | 168.00 | 91.31 | 259.76 | 168.00 | 91.76 |
| -6 | 259.27 | 168.00 | 91.27 | 259.68 | 168.00 | 91.68 |
| -4 | 259.28 | 169.00 | 90.28 | 259.47 | 169.00 | 90.47 |
| -2 | 259.13 | 168.00 | 91.13 | 259.45 | 168.00 | 91.45 |
| 0 | 259.25 | 168.00 | 91.25 | 259.70 | 168.00 | 91.70 |
| 2 | 259.27 | 168.00 | 91.27 | 259.50 | 168.00 | 91.50 |
| 4 | 259.27 | 168.00 | 91.27 | 259.51 | 168.00 | 91.51 |
| 6 | 259.25 | 167.00 | 92.25 | 259.50 | 167.00 | 92.50 |
| 8 | 259.28 | 168.00 | 91.28 | 259.48 | 168.00 | 91.48 |
| 10 | 258.96 | 167.00 | 91.96 | 259.48 | 167.00 | 92.48 |
| 12 | 259.31 | 167.00 | 92.31 | 259.71 | 167.00 | 92.71 |
| 14 | 259.40 | 168.00 | 91.40 | 259.78 | 168.00 | 91.78 |
| 16 | 259.39 | 168.00 | 91.39 | 259.80 | 168.00 | 91.80 |
| 18 | 259.67 | 168.00 | 91.67 | 260.41 | 168.00 | 92.41 |
| 20 | 259.75 | 168.00 | 91.75 | 260.20 | 168.00 | 92.20 |

FIG.19

| | EVALUATION IMAGE 0/THIN/LEFT END ||||||
| | GLOBAL ESTIMATION ONLY ||| GLOBAL ESTIMATION + LOCAL ESTIMATION |||
| | OUTER DIAMETER POINT | INNER DIAMETER POINT | THICKNESS (PIXEL) | OUTER DIAMETER POINT | INNER DIAMETER POINT | THICKNESS (PIXEL) |
|---|---|---|---|---|---|---|
| -20 | 81.12 | 126.00 | 44.88 | 81.28 | 125.00 | 43.72 |
| -18 | 81.11 | 126.00 | 44.89 | 81.30 | 126.00 | 44.70 |
| -16 | 81.13 | 126.00 | 44.87 | 81.28 | 126.00 | 44.72 |
| -14 | 81.15 | 126.00 | 44.85 | 81.27 | 126.00 | 44.73 |
| -12 | 80.84 | 125.00 | 44.16 | 80.85 | 125.00 | 44.15 |
| -10 | 80.84 | 125.00 | 44.16 | 80.85 | 125.00 | 44.15 |
| -8 | 80.87 | 125.00 | 44.13 | 80.89 | 125.00 | 44.11 |
| -6 | 80.84 | 125.00 | 44.16 | 80.86 | 125.00 | 44.14 |
| -4 | 80.85 | 125.00 | 44.15 | 80.87 | 125.00 | 44.13 |
| -2 | 81.03 | 125.00 | 43.97 | 81.01 | 125.00 | 43.99 |
| 0 | 81.01 | 125.00 | 43.99 | 80.99 | 125.00 | 44.01 |
| 2 | 81.00 | 125.00 | 44.00 | 81.00 | 125.00 | 44.00 |
| 4 | 80.99 | 125.00 | 44.01 | 80.99 | 125.00 | 44.01 |
| 6 | 80.83 | 125.00 | 44.17 | 80.82 | 125.00 | 44.18 |
| 8 | 80.87 | 125.00 | 44.13 | 80.87 | 125.00 | 44.13 |
| 10 | 80.85 | 125.00 | 44.15 | 80.85 | 125.00 | 44.15 |
| 12 | 80.90 | 125.00 | 44.10 | 80.90 | 125.00 | 44.10 |
| 14 | 81.18 | 126.00 | 44.82 | 81.31 | 126.00 | 44.69 |
| 16 | 81.31 | 126.00 | 44.69 | 81.52 | 126.00 | 44.48 |
| 18 | 81.31 | 126.00 | 44.69 | 81.31 | 126.00 | 44.69 |
| 20 | 81.16 | 126.00 | 44.84 | 81.26 | 126.00 | 44.74 |

FIG.20

| | EVALUATION IMAGE 0/THIN/RIGHT END | | | | | |
|---|---|---|---|---|---|---|
| | GLOBAL ESTIMATION ONLY | | | GLOBAL ESTIMATION + LOCAL ESTIMATION | | |
| | OUTER DIAMETER POINT | INNER DIAMETER POINT | THICKNESS (PIXEL) | OUTER DIAMETER POINT | INNER DIAMETER POINT | THICKNESS (PIXEL) |
| -20 | 179.97 | 132.00 | 47.97 | 180.11 | 132.00 | 48.11 |
| -18 | 180.14 | 132.00 | 48.14 | 180.01 | 132.00 | 48.01 |
| -16 | 180.01 | 133.00 | 47.01 | 179.91 | 133.00 | 46.91 |
| -14 | 180.10 | 133.00 | 47.10 | 180.08 | 133.00 | 47.08 |
| -12 | 179.31 | 132.00 | 47.31 | 179.46 | 132.00 | 47.46 |
| -10 | 179.59 | 132.00 | 47.59 | 179.42 | 132.00 | 47.42 |
| -8 | 179.62 | 132.00 | 47.62 | 179.34 | 132.00 | 47.34 |
| -6 | 187.42 | 132.00 | 55.42 | 179.38 | 132.00 | 47.38 |
| -4 | 179.60 | 132.00 | 47.60 | 179.34 | 132.00 | 47.34 |
| -2 | 179.17 | 132.00 | 47.17 | 179.17 | 132.00 | 47.17 |
| 0 | 179.17 | 132.00 | 47.17 | 179.17 | 132.00 | 47.17 |
| 2 | 179.43 | 132.00 | 47.43 | 179.43 | 132.00 | 47.43 |
| 4 | 179.64 | 132.00 | 47.64 | 179.44 | 132.00 | 47.44 |
| 6 | 179.45 | 132.00 | 47.45 | 179.45 | 132.00 | 47.45 |
| 8 | 179.72 | 132.00 | 47.72 | 179.51 | 132.00 | 47.51 |
| 10 | 179.86 | 132.00 | 47.86 | 179.77 | 132.00 | 47.77 |
| 12 | 179.91 | 132.00 | 47.91 | 179.77 | 132.00 | 47.77 |
| 14 | 180.09 | 132.00 | 48.09 | 179.99 | 132.00 | 47.99 |
| 16 | 180.20 | 132.00 | 48.20 | 180.22 | 132.00 | 48.22 |
| 18 | 180.14 | 133.00 | 47.14 | 180.14 | 133.00 | 47.14 |
| 20 | 180.27 | 133.00 | 47.27 | 180.43 | 133.00 | 47.43 |

FIG.21
LINE-SEGMENT DESIGNATION
DEPENDENCY EVALUATION SCHEMATIC VIEW
FIG.22
| | EVALUATION IMAGE 0/LARGE MEASUREMENT REGION | | | | | |
|---|---|---|---|---|---|---|
| | GLOBAL ESTIMATION ONLY | | | GLOBAL ESTIMATION + LOCAL ESTIMATION | | |
| | OUTER DIAMETER POINT | INNER DIAMETER POINT | THICKNESS (PIXEL) | OUTER DIAMETER POINT | INNER DIAMETER POINT | THICKNESS (PIXEL) |
| 0 | 43.28 | 120.00 | 76.72 | 42.34 | 120.00 | 77.66 |
| 100 | 43.28 | 120.00 | 76.72 | 42.34 | 120.00 | 77.66 |
| 200 | 43.27 | 120.00 | 76.73 | 42.34 | 120.00 | 77.66 |
| 300 | 46.68 | 120.00 | 73.32 | 42.37 | 120.00 | 77.63 |
| 400 | 46.68 | 120.00 | 73.32 | 42.37 | 120.00 | 77.63 |
| 500 | 46.67 | 120.00 | 73.33 | 42.37 | 120.00 | 77.63 |
| 600 | 46.67 | 120.00 | 73.33 | 42.37 | 120.00 | 77.63 |
| 700 | 46.67 | 120.00 | 73.33 | 42.37 | 120.00 | 77.63 |
| 800 | 50.70 | 122.00 | 71.30 | 42.39 | 120.00 | 77.61 |
| 900 | 50.70 | 122.00 | 71.30 | 42.39 | 120.00 | 77.61 |
| 1000 | 51.04 | 122.00 | 70.96 | 42.39 | 120.00 | 77.61 |
FIG.23
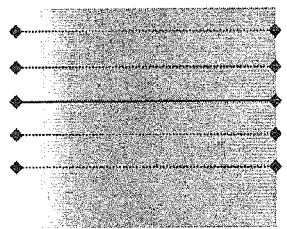
POSITION DEPENDENCY EVALUATION SCHEMATIC VIEW

FIG.24

| | EVALUATION IMAGE 0/THICK/LEFT END | | | | | |
|---|---|---|---|---|---|---|
| | GLOBAL ESTIMATION ONLY | | | GLOBAL ESTIMATION + LOCAL ESTIMATION | | |
| | OUTER DIAMETER POINT | INNER DIAMETER POINT | THICKNESS (PIXEL) | OUTER DIAMETER POINT | INNER DIAMETER POINT | THICKNESS (PIXEL) |
| -20 | 37.70 | 127.00 | 89.30 | 37.22 | 127.00 | 89.78 |
| -18 | 37.71 | 127.00 | 89.29 | 37.49 | 127.00 | 89.51 |
| -16 | 37.75 | 127.00 | 89.25 | 37.30 | 127.00 | 89.70 |
| -14 | 37.69 | 127.00 | 89.31 | 37.24 | 127.00 | 89.76 |
| -12 | 37.68 | 127.00 | 89.32 | 37.49 | 127.00 | 89.51 |
| -10 | 37.70 | 127.00 | 89.30 | 37.52 | 127.00 | 89.48 |
| -8 | 37.76 | 127.00 | 89.24 | 37.53 | 127.00 | 89.47 |
| -6 | 37.69 | 127.00 | 89.31 | 37.49 | 126.00 | 88.51 |
| -4 | 37.73 | 127.00 | 89.27 | 37.52 | 126.00 | 88.48 |
| -2 | 37.75 | 127.00 | 89.25 | 37.53 | 126.00 | 88.47 |
| 0 | 37.67 | 125.00 | 87.33 | 37.28 | 125.00 | 87.72 |
| 2 | 37.68 | 126.00 | 88.32 | 37.27 | 126.00 | 88.73 |
| 4 | 37.71 | 126.00 | 88.29 | 37.51 | 126.00 | 88.49 |
| 6 | 37.71 | 127.00 | 89.29 | 37.51 | 127.00 | 89.49 |
| 8 | 37.69 | 127.00 | 89.31 | 37.28 | 127.00 | 89.72 |
| 10 | 37.67 | 126.00 | 88.33 | 37.26 | 126.00 | 88.74 |
| 12 | 37.70 | 126.00 | 88.30 | 37.50 | 126.00 | 88.50 |
| 14 | 37.73 | 126.00 | 88.27 | 37.30 | 126.00 | 88.70 |
| 16 | 37.72 | 126.00 | 88.28 | 37.28 | 127.00 | 89.72 |
| 18 | 37.75 | 125.00 | 87.25 | 37.18 | 125.00 | 87.82 |
| 20 | 37.71 | 126.00 | 88.29 | 37.23 | 126.00 | 88.77 |

FIG.25

| | EVALUATION IMAGE 1/GENTLE INCLINATION | | | | | |
|---|---|---|---|---|---|---|
| | GLOBAL ESTIMATION ONLY | | | GLOBAL ESTIMATION + LOCAL ESTIMATION | | |
| | OUTER DIAMETER POINT | INNER DIAMETER POINT | THICKNESS (PIXEL) | OUTER DIAMETER POINT | INNER DIAMETER POINT | THICKNESS (PIXEL) |
| -20 | 28.28 | 41.00 | 12.72 | 28.31 | 41.00 | 12.69 |
| -18 | 27.98 | 43.00 | 15.02 | 28.16 | 41.00 | 12.84 |
| -16 | 27.65 | 43.00 | 15.35 | 27.94 | 41.00 | 13.06 |
| -14 | 27.51 | 41.00 | 13.49 | 27.79 | 41.00 | 13.21 |
| -12 | 27.28 | 41.00 | 13.72 | 27.51 | 40.00 | 12.49 |
| -10 | 27.17 | 40.00 | 12.83 | 27.18 | 40.00 | 12.82 |
| -8 | 26.85 | 40.00 | 13.15 | 26.95 | 40.00 | 13.05 |
| -6 | 26.52 | 40.00 | 13.48 | 26.80 | 40.00 | 13.20 |
| -4 | 26.27 | 40.00 | 13.73 | 26.51 | 40.00 | 13.49 |
| -2 | 26.17 | 40.00 | 13.83 | 26.20 | 38.00 | 11.80 |
| 0 | 25.90 | 40.00 | 14.10 | 25.95 | 40.00 | 14.05 |
| 2 | 25.36 | 39.00 | 13.64 | 25.81 | 39.00 | 13.19 |
| 4 | 25.25 | 39.00 | 13.75 | 25.30 | 38.00 | 12.70 |
| 6 | 25.14 | 39.00 | 13.86 | 25.18 | 38.00 | 12.82 |
| 8 | 24.84 | 39.00 | 14.16 | 24.93 | 39.00 | 14.07 |
| 10 | 30.61 | 39.00 | 8.39 | 24.80 | 39.00 | 14.20 |
| 12 | 24.30 | 39.00 | 14.70 | 24.50 | 37.00 | 12.50 |
| 14 | 24.11 | 38.00 | 13.89 | 24.16 | 37.00 | 12.84 |
| 16 | 23.85 | 38.00 | 14.15 | 23.94 | 37.00 | 13.06 |
| 18 | 23.49 | 37.00 | 13.51 | 23.59 | 37.00 | 13.41 |
| 20 | 23.21 | 38.00 | 14.79 | 23.26 | 37.00 | 13.74 |

FIG.26

| | EVALUATION IMAGE 2/STEEP INCLINATION |||||| 
|---|---|---|---|---|---|---|
| | GLOBAL ESTIMATION ONLY ||| GLOBAL ESTIMATION + LOCAL ESTIMATION |||
| | OUTER DIAMETER POINT | INNER DIAMETER POINT | THICKNESS (PIXEL) | OUTER DIAMETER POINT | INNER DIAMETER POINT | THICKNESS (PIXEL) |
| -20 | 34.85 | 46.00 | 11.15 | 34.87 | 46.00 | 11.13 |
| -18 | 36.77 | 48.00 | 11.23 | 36.59 | 48.00 | 11.41 |
| -16 | 38.31 | 49.00 | 10.69 | 38.51 | 49.00 | 10.49 |
| -14 | 40.15 | 52.00 | 11.85 | 40.20 | 51.00 | 10.80 |
| -12 | 42.06 | 54.00 | 11.94 | 42.11 | 54.00 | 11.89 |
| -10 | 43.91 | 56.00 | 12.09 | 43.99 | 56.00 | 12.01 |
| -8 | 45.81 | 57.00 | 11.19 | 45.82 | 57.00 | 11.18 |
| -6 | 47.55 | 59.00 | 11.45 | 47.54 | 59.00 | 11.46 |
| -4 | 49.26 | 61.00 | 11.74 | 49.45 | 61.00 | 11.55 |
| -2 | 51.08 | 63.00 | 11.92 | 51.12 | 63.00 | 11.88 |
| 0 | 52.92 | 65.00 | 12.08 | 52.99 | 64.00 | 11.01 |
| 2 | 54.81 | 67.00 | 12.19 | 54.82 | 67.00 | 12.18 |
| 4 | 56.54 | 68.00 | 11.46 | 56.54 | 68.00 | 11.46 |
| 6 | 58.19 | 70.00 | 11.81 | 58.45 | 70.00 | 11.55 |
| 8 | 60.09 | 72.00 | 11.91 | 60.12 | 71.00 | 10.88 |
| 10 | 61.97 | 74.00 | 12.03 | 62.01 | 73.00 | 10.99 |
| 12 | 63.79 | 75.00 | 11.21 | 63.60 | 75.00 | 11.40 |
| 14 | 65.33 | 77.00 | 11.67 | 65.51 | 77.00 | 11.49 |
| 16 | 67.16 | 79.00 | 11.84 | 67.21 | 79.00 | 11.79 |
| 18 | 68.98 | 81.00 | 12.02 | 69.07 | 81.00 | 11.93 |
| 20 | 70.86 | 82.00 | 11.14 | 70.88 | 82.00 | 11.12 |

FIG.27

| | EVALUATION IMAGE 3/WAVY OUTER WALL/NOISY ||||||
| | GLOBAL ESTIMATION ONLY ||| GLOBAL ESTIMATION + LOCAL ESTIMATION |||
| | OUTER DIAMETER POINT | INNER DIAMETER POINT | THICKNESS (PIXEL) | OUTER DIAMETER POINT | INNER DIAMETER POINT | THICKNESS (PIXEL) |
|---|---|---|---|---|---|---|
| -20 | 157.36 | 200.00 | 42.64 | 157.38 | 201.00 | 43.62 |
| -18 | 157.42 | 201.00 | 43.58 | 157.70 | 201.00 | 43.30 |
| -16 | 157.35 | 201.00 | 43.65 | 158.69 | 201.00 | 42.31 |
| -14 | 157.31 | 201.00 | 43.69 | 157.40 | 201.00 | 43.60 |
| -12 | 157.43 | 201.00 | 43.57 | 157.75 | 200.00 | 42.25 |
| -10 | 157.09 | 202.00 | 44.91 | 156.67 | 202.00 | 45.33 |
| -8 | 156.57 | 201.00 | 44.43 | 156.05 | 202.00 | 45.95 |
| -6 | 156.58 | 201.00 | 44.42 | 156.60 | 202.00 | 45.40 |
| -4 | 156.63 | 203.00 | 46.37 | 156.61 | 203.00 | 46.39 |
| -2 | 156.52 | 203.00 | 46.48 | 156.62 | 203.00 | 46.38 |
| 0 | 156.46 | 203.00 | 46.54 | 156.45 | 203.00 | 46.55 |
| 2 | 156.16 | 203.00 | 46.84 | 156.35 | 203.00 | 46.65 |
| 4 | 155.72 | 202.00 | 46.28 | 155.82 | 203.00 | 47.18 |
| 6 | 155.45 | 203.00 | 47.55 | 155.60 | 203.00 | 47.40 |
| 8 | 155.20 | 203.00 | 47.80 | 155.45 | 203.00 | 47.55 |
| 10 | 154.78 | 203.00 | 48.22 | 154.18 | 203.00 | 48.82 |
| 12 | 154.65 | 203.00 | 48.35 | 154.67 | 203.00 | 48.33 |
| 14 | 154.53 | 204.00 | 49.47 | 154.57 | 204.00 | 49.43 |
| 16 | 154.15 | 203.00 | 48.85 | 154.19 | 203.00 | 48.81 |
| 18 | 154.08 | 203.00 | 48.92 | 154.29 | 203.00 | 48.71 |
| 20 | 153.73 | 203.00 | 49.27 | 152.76 | 203.00 | 50.24 |

PIPE THICKNESS MEASURING DEVICE AND METHOD, AND RECORDING MEDIUM

CROSS-REFERENCE TO RELATED APPLICATIONS

This application is a continuation application and claims the priority benefit under 35 U.S.C. §120 of PCT Application No. PCT/JP2011/068118 filed on Aug. 9, 2011 which application designates the U.S., and also claims the priority benefit under 35 U.S.C. §119 of Japanese Patent Application No. 2010-189518 filed on Aug. 26, 2010, which applications are all hereby incorporated by reference in their entireties.

BACKGROUND OF THE INVENTION

1. Field of the Invention

The present invention relates to a pipe thickness measuring device and method, and recording medium and, in particular, to a technology of measuring a pipe thickness by using radiographic images of a pipe for the purpose of non-destructive inspection.

2. Description of the Related Art

Conventionally, as a device for measuring the thickness of a cylindrical body (hereinafter referred to as a "pipe") by using radioactive rays, a device has been suggested, the device in which a sensor is located in a position where radioactive rays is emitted in parallel to a pipe tangential direction and where the radioactive rays having passed through the center of the pipe enters, and a pipe thickness is measured based on a amount of transmission radiation detected by the sensor (Japanese Patent Application Laid-Open No. 2009-36708).

Also, as a method of measuring a concrete thickness in a steel pipe configured by filling the inside of the steel pipe with concrete by centrifugal force, a method has been suggested in which: brightness information of each of radiographed images with different lengths of X-ray irradiation time is extracted; brightness distributions of the extraction results of the brightness information with a short irradiation time and the brightness information with a long irradiation time are combined; and an outer diameter of the steel pipe and an inner diameter of the concrete are estimated from an inflection point of the brightness distributions, thereby measuring a concrete thickness (Japanese Patent Application Laid-Open No. 2005-257610). Note that a known value or a value separately measured is used as the thickness of the steel pipe.

That is, in an image obtained by short-time X-ray irradiation, both edges of the steel pipe is clearly shown, but it is difficult to judge the state of the inside. On the other hand, in an image obtained by long-time X-ray irradiation, both edges of the steel pipe is blurred and unclear. To solve this problem, in the invention described in Japanese Patent Application Laid-Open No. 2005-257610,radiography with different lengths of X-ray irradiation time are performed to obtain images.

Also, it has been suggested that, in an X-ray CT device for constructing a tomogram of a subject to be shot along any slice surface, when a dimension between two edges specified on the tomogram is measured, position information of each edge is extracted from a differential value of line profile of CT values to a direction connecting the edges (Japanese Patent Application Laid-Open No. 2008-185359).

SUMMARY OF INVENTION

In the invention described in Japanese Patent Application Laid-Open No. 2009-36708,the pipe thickness is measured based on the amount of transmission radiation, and an error in measurement may occur depending on the material of the pipe and others.

Also, in the invention described in Japanese Patent Application Laid-Open No. 2005-257610,brightness information of radiographed images with different lengths of X-ray irradiation time are combined and, from an inflection point of the brightness distributions, an outer diameter of the steel pipe and and inner diameter of the concrete are estimated. Therefore, it is required to perform X-ray radiography twice with different lengths of X-ray irradiation time, and also to appropriately combine brightness information of radiographed images obtained by radiography. However, Cited Reference 2 does not describe any combining method.

Furthermore, while Japanese Patent Application Laid-Open No. 2008-185359 describes that an edge position of the outer shape of a subject to be radiographed is detected from a differential value of line profiles of CT values, detection of an inner diameter point of a pipe is not described.

Meanwhile, since X-ray absorption does not occur outside an outer diameter point of the pipe, an abrupt signal change occurs near the outer diameter point. At an inner diameter point of the pipe, absorption is maximum, and therefore the detected signal is the weakest, and a signal nearby exhibits a moderate change compared with the periphery of the outer diameter point.

Therefore, when the invention described in Japanese Patent Application Laid-Open No. 2008-185359 is applied to pipe thickness measurement, for detection of an outer diameter point of the pipe, a signal change near the outer diameter point can be detected based on a differential value of the signal. However, for detection of an inner diameter point of the pipe, since the signal is the weakest and changes moderately, accurate detection cannot be made. Note that, in the invention described in Japanese Patent Application Laid-Open No. 2005-257610,X-ray irradiation time is increased in order to increase the amount of X-rays (signals) passing through the inside of the steel pipe.

The present invention was made in view of these circumstances, and aims to provide a pipe thickness measuring device and method capable of accurately estimating an outer diameter point and an inner diameter point of a pipe by using a luminance profile in a direction crossing the pipe among radiographic images of the pipe.

To achieve the object described above, a pipe thickness measuring device according to a first aspect of the present invention includes: a luminance profile obtaining unit which obtains luminance profiles in a direction crossing a pipe to be measured from radiographic images of the pipe; an outer diameter point detecting unit which detects outer diameter points of the pipe based on the obtained luminance profiles; a region setting unit which sets a predetermined region inside two of the outer diameter points of the pipe detected by the outer diameter point detecting unit; and an inner diameter point detecting unit which detects inner diameter points of the pipe based on a luminance profile corresponding to the set predetermined region from among the luminance profiles obtained by the luminance profile obtaining unit.

In the pipe thickness measuring device according to the first aspect, different luminance profiles are applied to the case of detecting an outer diameter point of the pipe and the case of detecting an inner diameter point. In particular, in the case of detecting an inner diameter point, the inner diameter point is detected based on a luminance profile corresponding to the predetermined region inside two outer diameter points of the pipe (that is, a luminance profile with information not relating to inner diameter point estimation eliminated therefrom). Therefore, inner diameter point detection (estimation) can be accurately performed.

Further, according to a second aspect, in the pipe thickness measuring device according to the first aspect described above, the outer diameter point detecting unit includes a first order differential profile calculating unit which calculates a first order differential profile by first order differentiating the luminance profile obtained by the luminance profile obtaining unit, a noise removing unit which removes noise components from the first order differential profile, and a unit which detects the outer diameter points each based on a maximum value or a minimum value of the first order differential profile from which the noise components are removed.

Furthermore, according to a third aspect, in the pipe thickness measuring device according to the first aspect described above, the outer diameter point detecting unit includes a first order differential profile calculating unit which calculates a first order differential profile by first order differentiating the luminance profile obtained by the luminance profile obtaining unit, a noise removing unit which removes noise components from the first order differential profile, a second order differential profile calculating unit which calculates a second order differential profile by differentiating the first order differential profile from which the noise components are removed so as to perform second order differentiation, and a detecting unit which detects the outer diameter points each based on a zero cross point of the calculated second order differential profile.

Still further, according to a fourth aspect, in the pipe thickness measuring device according to the first aspect described above, the outer diameter point detecting unit includes a normalizing unit which normalizes the luminance profile obtained by the luminance profile obtaining unit, a first order differential profile calculating unit which calculates a first order differential profile by first order differentiating the normalized luminance profile, a noise removing unit which removes noise components from the first order differential profile, a second order differential profile calculating unit which calculates a second order differential profile by differentiating the first order differential profile from which the noise components are removed, a zero cross region setting unit which detects a zero cross point of the calculated second order differential profile and sets a zero cross region near the zero cross point, an approximate curve calculating unit which calculates an approximate curve by approximating a second order differential profile of the set zero cross region with a predetermined function, and a detecting unit which detects the outer diameter points each based on a zero cross point of the calculated approximate curve.

While the actual outer diameter point of the pipe is present in the zero cross region near the zero cross point of the calculated second order differential profile, this second order differential profile of this zero cross region is approximated with an approximate curve of a predetermined function, and an outer diameter point is detected based on a zero cross point of the approximate curve. Therefore, detection error due to the shape of the second order differential profile can be minimized.

Still further, according to a fifth aspect, in the pipe thickness measuring device according to the first aspect described above, the outer diameter point detecting unit includes a first normalizing unit which normalizes the luminance profile obtained by the luminance profile obtaining unit, a first first-order differential profile calculating unit which calculates a first order differential profile by first order differentiating the normalized luminance profile, a first noise removing unit which removes noise components from the first order differential profile, a first second-order differential profile calculating unit which calculates a second order differential profile by differentiating the first order differential profile from which the noise components are removed, a first zero cross region setting unit which detects a zero cross point of the calculated second order differential profile and sets a zero cross region near the zero cross point, a first approximate curve calculating unit which calculates an approximate curve by approximating a second order differential profile of the set zero cross region with a predetermined function, a first detecting unit which detects a rough outer diameter point based on a zero cross point of the calculated approximate curve, an extracting unit which extracts a luminance profile near the detected rough outer diameter point among the luminance profiles obtained by the luminance profile obtaining unit, a second normalizing unit which normalizes the extracted luminance profile, a second first-order differential profile calculating unit calculates a first order differential profile by first order differentiating the normalized luminance profile, a second noise removing unit which removes noise components from the first order differential profile, a second second-order differential profile calculating unit which calculates a second order differential profile by differentiating the first order differential profile from which the noise components are removed, a second zero cross region setting unit which detects a zero cross point of the calculated second order differential profile and sets a zero cross region near the zero cross point, a second approximate curve calculating unit which calculates an approximate curve by approximating a second order differential profile of the set zero cross region with a predetermined function, and a second detecting unit which detects a precise outer diameter point based on a zero cross point of the calculated approximate curve.

After the rough outer diameter point (a rough outer shape point) of the pipe is detected in the manner as described above, an outer diameter point is detected based on a luminance profile near that rough outer diameter point (that is, a luminance profile with information not relating to outer diameter point estimation being eliminated therefrom). Therefore, outer diameter detection (estimation) can be more accurately performed.

Still further, according to a sixth aspect, in the pipe thickness measuring device according to the fifth aspect described above, the second noise removing unit has a cutoff frequency higher than a cutoff frequency of the first noise removing unit. At the time of precise outer diameter point detection, the luminance profile near the rough outer diameter point is used (information not relating to outer diameter point estimation is eliminated), and therefore noise removal is weakened.

Still further, according to a seventh aspect, in the pipe thickness measuring device according to the fifth or sixth aspect described above, the first approximate curve calculating unit and the second approximate curve calculating unit calculates the first approximate curve and the second approximate curve by using data of each predetermined number of samplings from each corresponding second order differential profile, and the number of samplings of the second approximate curve calculating unit is smaller than the number of samplings of the first approximate curve calculating unit. At the time of precise outer diameter point detection, information near the rough outer diameter point (information with a less number of samplings) is used. With this, an approximate curve (a second approximate curve) suitable for the second order differential profile corresponding to the periphery of the rough outer diameter point can be found.

Still further, according to an eighth aspect, in the pipe thickness measuring device according to any one of the first to seventh aspects described above, the region setting unit sets the predetermined region based on a predetermined threshold larger than a minimum luminance value of the luminance profile and equal to or less than a luminance value at an approximately center of the pipe. With this, by setting a region (a range of luminance profiles) sectioned with the predetermined threshold at least equal to or less than the luminance value at the approximately center of the pipe, information not required for pipe inner diameter point estimation is removed.

Still further, according to a ninth aspect, in the pipe thickness measuring device according to any one of the first to eighth aspects described above, the inner diameter point detecting unit includes an extracting unit which extracts a predetermined section including a local minimum value of the luminance profile corresponding to the predetermined region set by the region setting unit, an approximate curve calculating unit which calculates an approximate curve by approximating a luminance profile in the extracted section with a predetermined function, and a detecting unit which detects the inner diameter points of the pipe based on a local minimum value of the calculated approximate curve.

Still further, according to a tenth aspect, in the pipe thickness measuring device according to any one of the first to eighth aspects described above, the inner diameter point detecting unit includes a normalizing unit which normalizes a luminance profile corresponding to the predetermined region set by the region setting unit, an extracting unit which extracts a predetermined section including a local minimum value of the normalized luminance profile, an approximate curve calculating unit which calculates an approximate curve by approximating a luminance profile in the extracted section with a predetermined function, and a detecting unit which detects the inner diameter points of the pipe based on a local minimum value of the calculated approximate curve.

Still further, according to an eleventh aspect, in the pipe thickness measuring device according to any one of the first to eighth aspects described above, the inner diameter point detecting unit includes a normalizing unit which normalizes a luminance profile corresponding to the predetermined region set by the region setting unit, a first order differential profile calculating unit which calculates a first order differential profile by first order differentiating the normalized luminance profile, a first noise removing unit which removes noise components from the first order differential profile, an extracting unit which extracts a predetermined section including a zero cross point of the first order differential profile from which the noise components are removed, an approximate curve calculating unit which calculates an approximate curve by approximating a first order differential profile in the extracted section with a predetermined function, and a detecting unit which detects the inner diameter points of the pipe based on a zero cross point of the calculated approximate curve.

Still further, according to a twelfth aspect, in the pipe thickness measuring device according to any one of the first to eighth aspects described above, the inner diameter point detecting unit includes a normalizing unit which normalizes a luminance profile corresponding to the predetermined region set by the region setting unit, a first order differential profile calculating unit which calculates a first order differential profile by first order differentiating the normalized luminance profile, a noise removing unit which removes noise components from the first order differential profile, a second order differential profile calculating unit which calculates a second order differential profile by differentiating the first order differential profile from which the noise components are removed, an extracting unit which extracts a predetermined section including a local maximum value of the calculated second order differential profile, an approximate curve calculating unit which calculates an approximate curve by approximating a second order differential profile in the extracted section with a predetermined function, and a detecting unit which detects the inner diameter points of the pipe based on a local maximum value of the calculated approximate curve.

Still further, according to a thirteenth aspect, in the pipe thickness measuring device according to any one of the fourth to seventh aspects and the ninth to twelfth aspects described above, the predetermined function is a second order function or a third order function. The order of the predetermined function is preferably as small as possible so that the approximate curve does not accurately go along the shape of the profile. Note that a third order function is more preferable than a second order function so that the function can be applied also to the case in which the shape of the profile is not bilaterally symmetrical.

Still further, according to a fourteenth aspect, the pipe thickness measuring device according to any one of the first to thirteenth aspects described above includes a measuring unit which measures the pipe thickness based on a difference between one of the outer diameter points of the pipe detected by the outer diameter point detecting unit and one of the inner diameter points detected by the inner diameter point detecting unit, the inner diameter point corresponding to the outer diameter point, and an output unit which outputs the measurement results.

Still further, a pipe thickness measuring method according to a fifteenth aspect of the present invention includes: a luminance profile obtaining step of obtaining luminance profiles in a direction crossing a pipe to be measured from radiographic images of the pipe; a step of calculating a first order differential profile by first order differentiating one of the obtained luminance profiles or a second order differential profile by second order differentiating the luminance profile; an outer diameter point detecting step of detecting outer diameter points of the pipe based on a maximum value or a minimum value of the calculated first order differential profile, or based on a zero cross point of the second order differential profile; a region setting step of setting a predetermined region inside two of the detected outer diameter points of the pipe; and an inner diameter point detecting step of detecting inner diameter points of the pipe based on a minimum value of a luminance profile corresponding to the set predetermined region from among the luminance profiles obtained in the luminance profile obtaining step, or a zero cross point of a first order differential profile obtained by first order differentiating the luminance file, or a maximum value of a second order differential profiled obtained by second order differentiating the luminance file.

Also, a computer-readably recording medium having a program recorded thereon, the program causing a computer to achieve the pipe thickness measuring method described above is included in the present invention.

According to the present invention, when the luminance profiles in the direction crossing the pipe from among the radiographic images of the pipe are used to detect an outer diameter point and an inner diameter point of the pipe, different luminance profiles are applied to the case of detecting an outer diameter point of the pipe and the case of detecting an inner diameter point. In particular, in the case of detecting an inner diameter point, the inner diameter point is detected based on a luminance profile corresponding to a predetermined region inside two outer diameter points of the pipe (that is, a luminance profile from which information not relating to inner diameter point estimation is eliminated). With this, inner diameter point detection (estimation) can be accurately performed and, in turn, the pipe thickness can be correctly measured.

BRIEF DESCRIPTION OF THE DRAWINGS

FIG. 15 is a table showing relations between each of Evaluation Images 0 to 3 and measured regions.

FIG. 16 is a drawing that depicts a method of obtaining an extracted luminance profile to confirm line-segment designation dependency of the present pipe thickness measurement algorithm.

FIG. 17 is a table showing measurement results by a pipe thickness measuring method of the first embodiment (No. 1).

FIG. 18 is a table showing measurement results by a pipe thickness measuring method of the first embodiment (No. 2).

FIG. 19 is a table showing measurement results by a pipe thickness measuring method of the first embodiment (No. 3).

FIG. 20 is a table showing measurement results by a pipe thickness measuring method of the first embodiment (No. 4).

FIG. 21 is a drawing that depicts a method of obtaining an extracted luminance profile to confirm selection range dependency of the present pipe thickness measurement algorithm.

FIG. 22 is a table showing results of measurement of selection range dependency.

FIG. 23 is a drawing that depicts a method of obtaining an extracted luminance profile to confirm position dependency of the present pipe thickness measurement algorithm.

FIG. 24 is a table showing measurement results of measurement position dependency (No. 1).

FIG. 25 is a table showing measurement results of measurement position dependency (No. 2).

FIG. 26 is a table showing measurement results of measurement position dependency (No. 3).

FIG. 27 is a table showing measurement results of measurement position dependency (No. 4).

DESCRIPTION OF EMBODIMENTS

Embodiments of the pipe thickness measuring device and method according to the present invention are described below according to the attached drawings.

[Obtainment of Pipe Radiographic Image]

Figure 1:
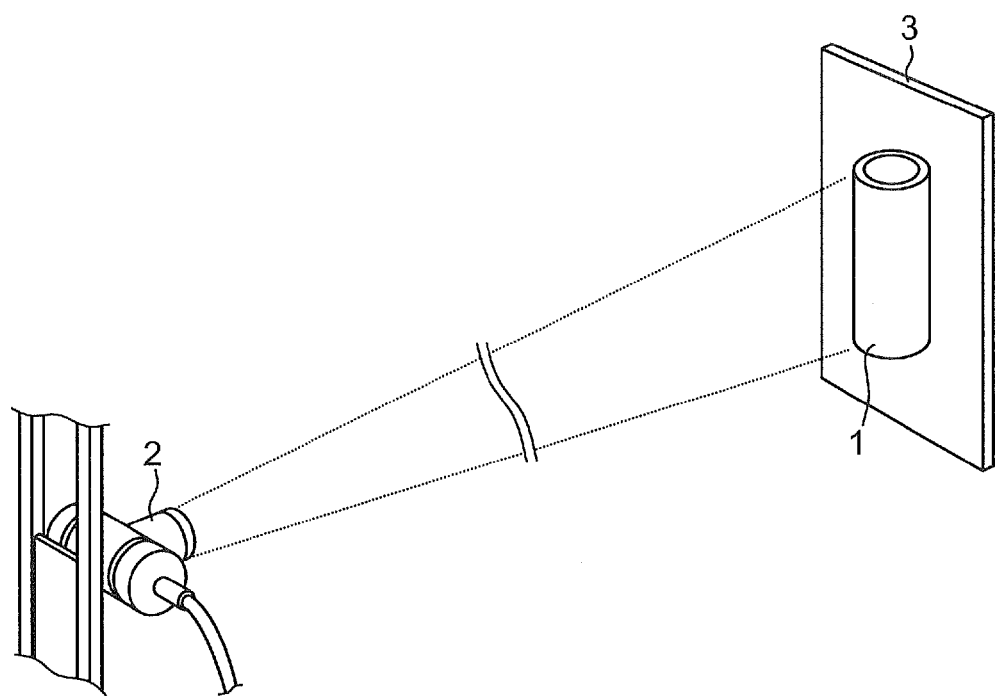
FIG. 1 is a drawing that depicts a state of an X-ray radiography of a pipe to be measured.

FIG. 1 is a drawing that depicts the state of an X-ray radiography of a pipe to be measured. Although a short pipe 1 is shown in FIG. 1, FIG. 1 is a drawing schematically depicting a pipeline arranged in any of various facilities.

As depicted in FIG. 1, an X-ray source 2 is placed at a position sufficiently away from the pipe 1, and an imaging plate (IP: phosphorescent film) 3 is placed at a position facing the X-ray source 2 across the pipe 1. Note that the IP 3 is placed near the pipe 1. Also, the IP 3 is not restricted to a flat-plate-type IP and may be a curved-type IP. Furthermore, while the IP 3 is used in this embodiment, an X-ray film may be used.

An X-ray emitted from the X-ray source 2 passes through the pipe 1 to enter the IP 3, and is stored in the IP 3 as energy information (X-ray image information) according to the incident dose. The X-ray image information stored in this IP 3 is read out by an IP image reading device 50 depicted in FIG. 2, and is captured into a pipe thickness measuring device 10 as an X-ray radiographic image of the pipe 1.

[Pipe Thickness Measuring Device]

Figure 2:
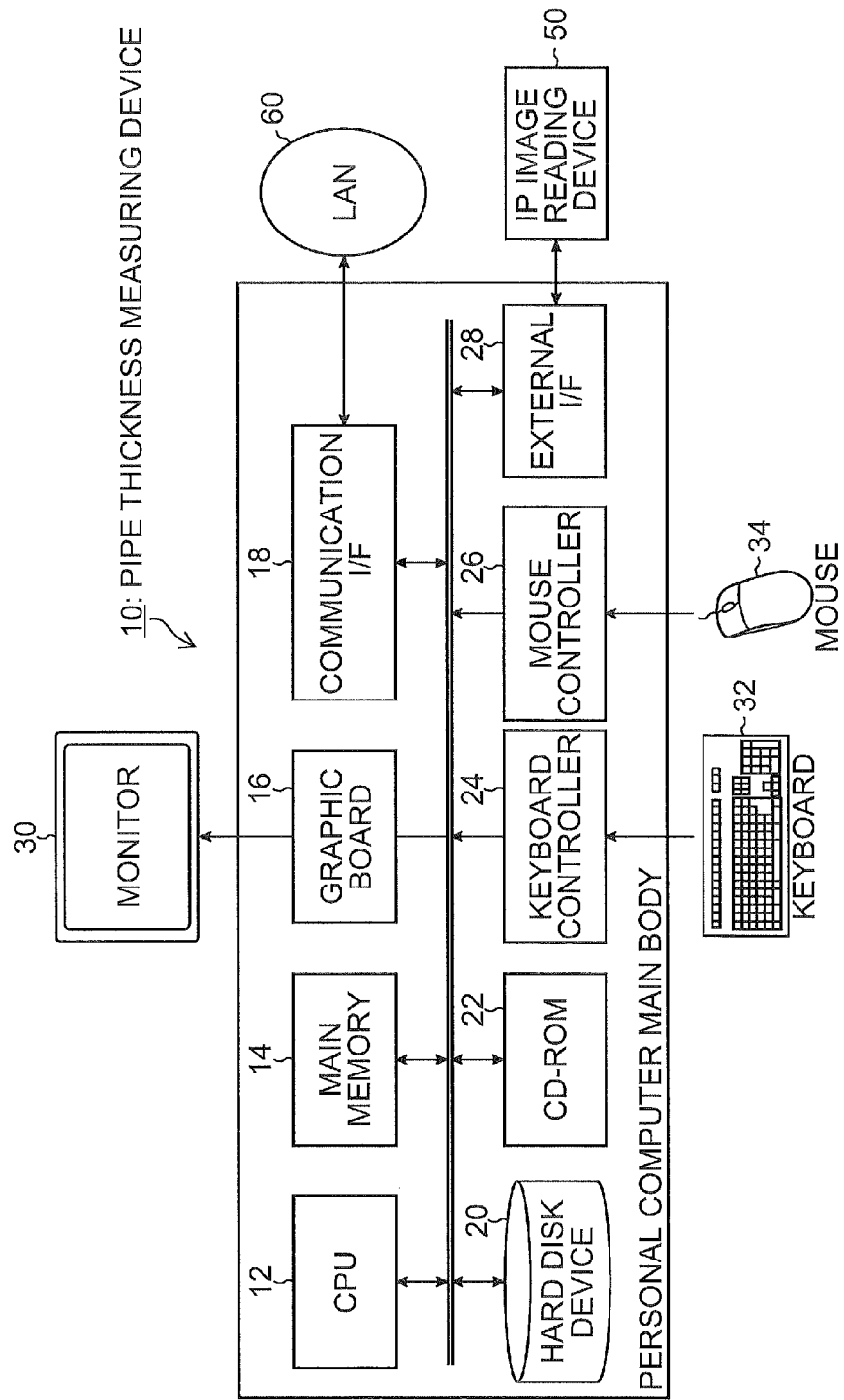
FIG. 2 is a block diagram of an embodiment of a pipe thickness measuring device according to the present invention.

FIG. 2 is a block diagram of an embodiment of the pipe thickness measuring device 10 according to the present invention.

This pipe thickness measuring device 10 is composed of, for example, a personal computer, and includes a central processing unit (CPU) 12; a main memory 14 having stored therein a control program of the device and serving as a working area at the time of execution of a program; a graphic board 16 controlling display of a monitor device 30 such as a liquid-crystal display or a CRT (Cathode Ray Tube) display; a communication interface (a communication I/F) 18 connected to a network 60; a hard disk device 20 having stored therein an operating system (OS) of the personal computer, software achieving a pipe thickness measurement algorithm, a device driver of a peripheral device, and others; a CD-ROM (Compact Disk Read Only Memory) drive 22, a keyboard controller 24 detecting a key operation on a keyboard 32 for output as an instruction input to the CPU 12; a mouse controller 26 detecting the state of a mouse 34 as a position input device and outputting a signal indicating a mouse pointer on the monitor device 30, the state of the mouse 34, or others to the CPU 12; and an external interface (an external I/F) 28.

The IP image reading device 50 is provided in order to read the X-ray image information stored in the IP 3 depicted in FIG. 1 and capture the information as a digital image into the pipe thickness measuring device 10, and is connected to the pipe thickness measuring device 10 via the external I/F 28.

Note that the digital image of the radiographic image of the pipe is not restricted to the one obtained from the IP image reading device 50 described above, and an X-ray radiographic image of the pipe digitalized in advance may be obtained via the network 60.

The pipe thickness measuring device 10 analyzes the digitalized X-ray radiographic image of the pipe 1 captured in the manner described above to measure the thickness of the pipe 1, details of which will be described further below.

<First Embodiment>

Figure 3:
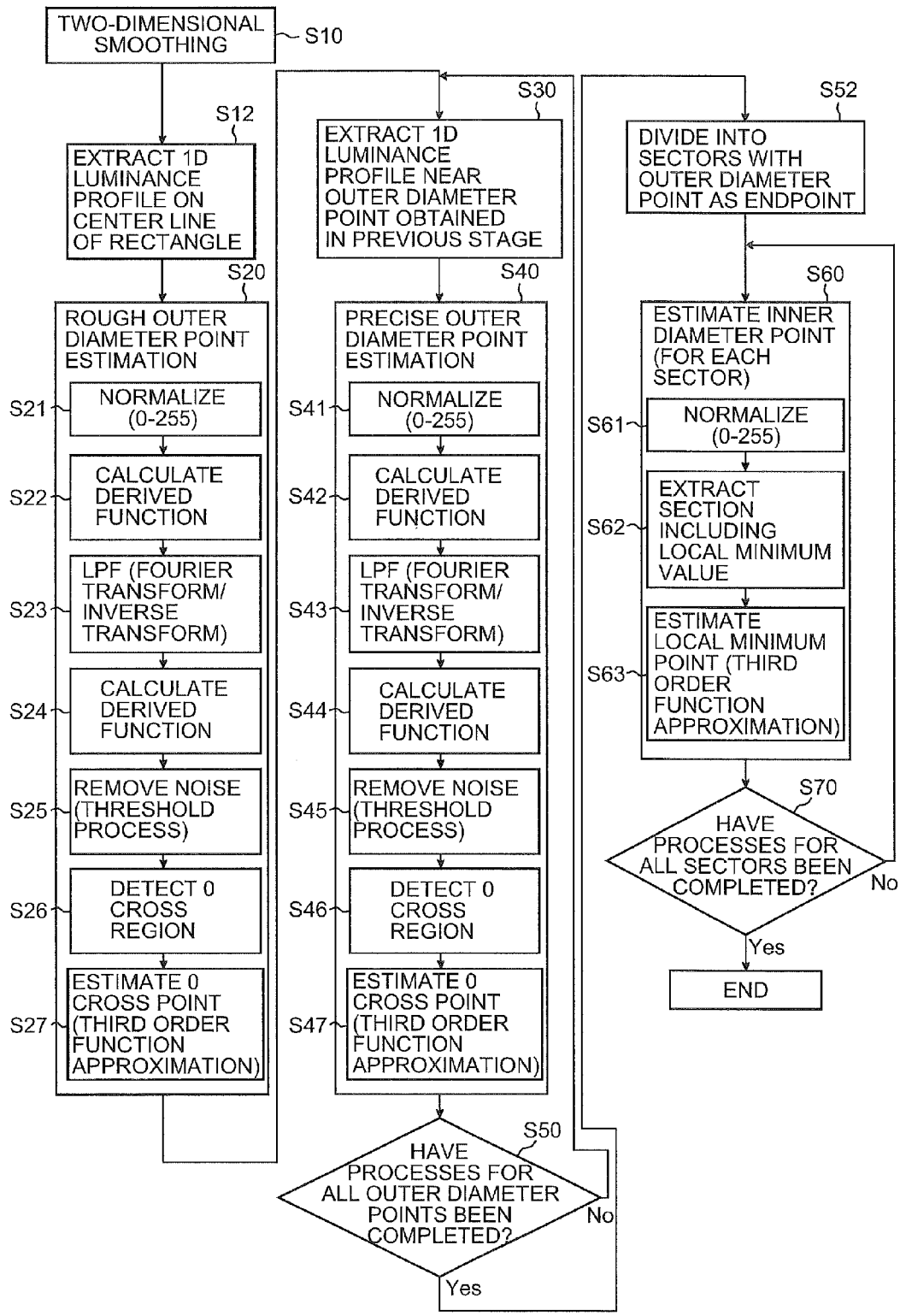
FIG. 3 is a flowchart of a first embodiment of the pipe thickness measuring process by the pipe thickness measuring device according to the present invention.

FIG. 3 is a flowchart of a first embodiment of a pipe thickness measuring process by the pipe thickness measuring device 10 according to the present invention. This pipe thickness measuring device 10 accurately estimates an outer diameter point and an inner diameter point on the image of the pipe 1 from the X-ray radiographic image of the pipe 1 to measure the pipe thickness. In the following, details of a process of estimating an outer diameter point and an inner diameter point of the pipe 1 according to FIG. 3.

Figure 4:
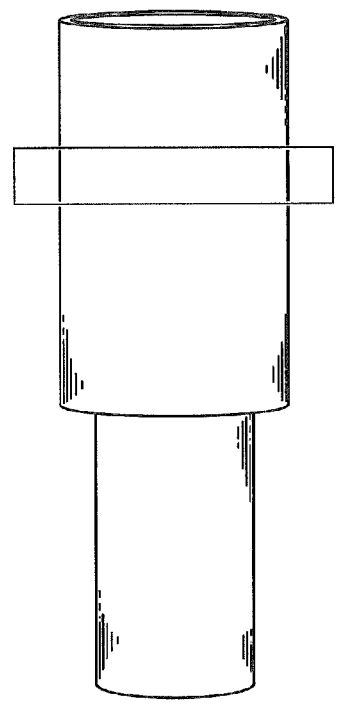
FIG. 4 is a drawing explaining extraction of a luminance profile of the pipe.

In FIG. 3, an X-ray radiographic image (a two-dimensional image (2D image) of the pipe obtained from the IP image reading device 50 is inputted and, as depicted in FIG. 4, a one-dimensional (1D) luminance profile on a center line of a rectangle in the 2D image is extracted (steps S10 and S12). This original luminance profile represents luminance values (for example, in a 16-bit gray scale) for each coordinate position (pixel position) in a direction orthogonal to an outer wall of the pipe 1.

Next, rough estimation of an outer diameter point is performed based on the extracted luminance profile (step S20).

In rough outer diameter point estimation, the original luminance profile is first normalized. Specifically, normalization is performed so that the minimum value of the 16-bit original luminance profile is 0 and the maximum value thereof is 255 (step S21).

Figure 5:
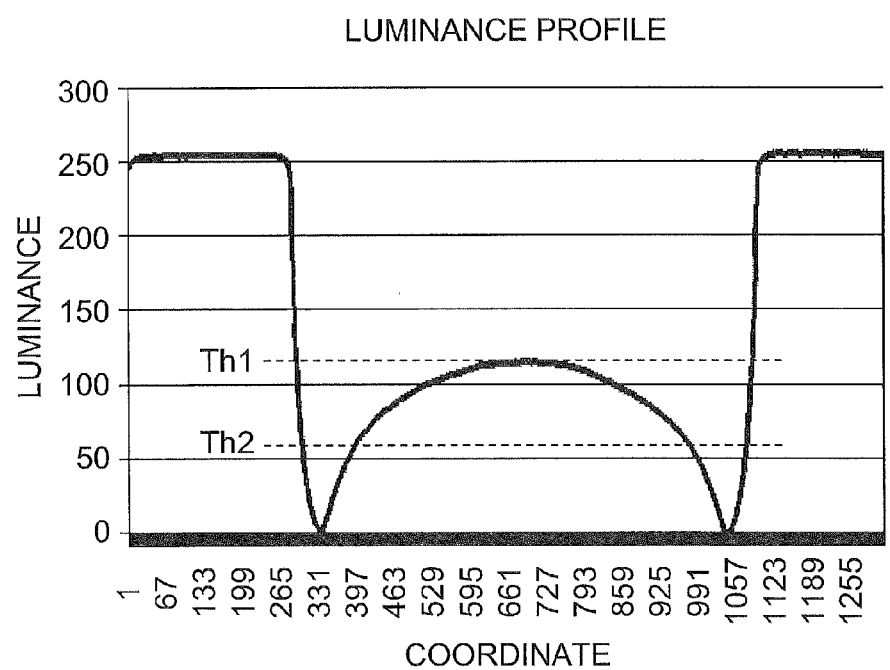
FIG. 5 is a graph depicting an example of the normalized luminance profile of the pipe.

FIG. 5 is a graph depicting an example of the normalized luminance profile of the pipe 1 in which the minimum value to the maximum value are normalized to 0 to 255.

Figure 6:
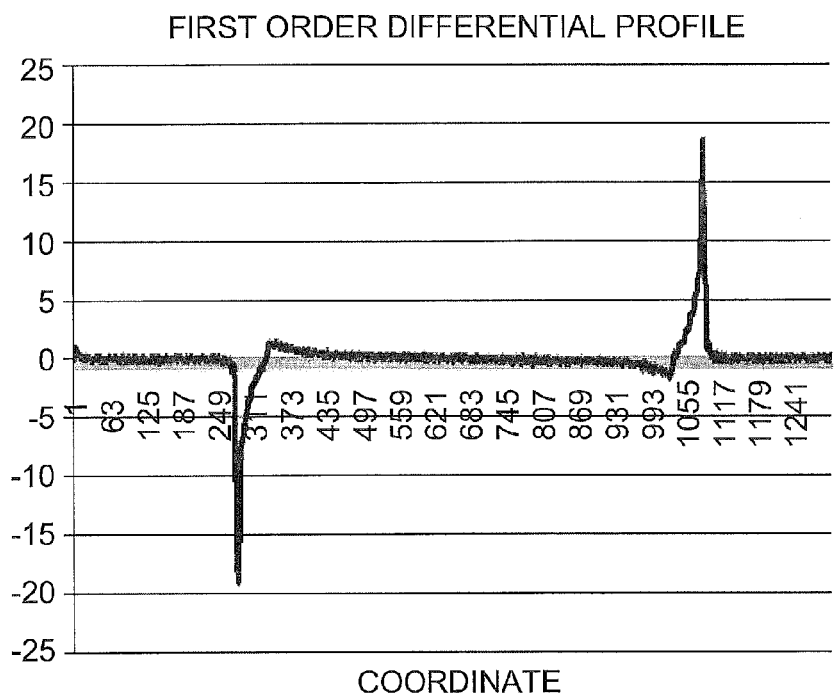
FIG. 6 is a graph depicting an example of a first order differential profile.

Subsequently, the normalized luminance profile is differentiated to calculate a derived function (a first order differential profile) (step S22). This first order differential profile is calculated by finding a difference between luminance values of adjacent pixels. FIG. 6 is a graph depicting an example of the first order differential profile described above.

Next, noise components are removed from the first order differential profile (step S23). This noise removal process is performed by performing Fourier transform on the first order differential profile, dividing the profile for each frequency component, removing high-frequency components including noise by a low-pass filter (LPF), and performing inverse Fourier transform on the result.

Figure 7:
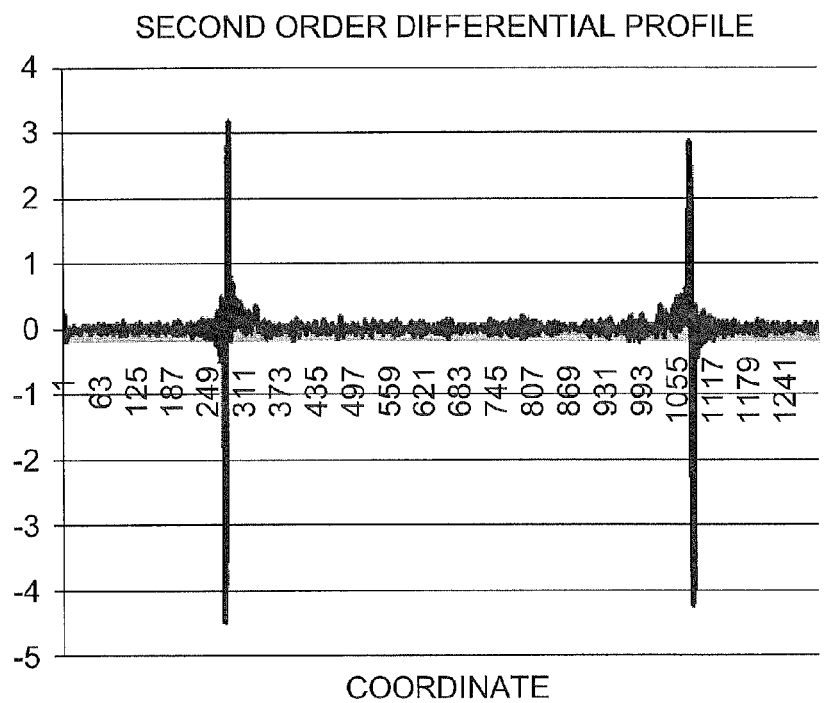
FIG. 7 is a graph depicting an example of a second order differential profile.

The noise-removed first order differential profile is further differentiated to calculate a derived function (step S24). FIG. 7 is a graph depicting an example of the second order differential profile described above.

Subsequently, after noise removal is performed by a threshold process (step S25), a zero cross point of the second order differential profile from which the noise has been removed is detected, and a peripheral region (a zero cross region) of the zero cross point is set (step S26).

Then, based on data of a plurality of (for example, 50) sampling points of the second order differential profile of the set zero cross region, the second order differential profile is approximated with a third order function. That is, a third order function with a square error from each sampling point being minimum is found. A coordinate position of a zero cross point of the third order function thus found is estimated as a position of a rough outer diameter point (step S27).

Based on the outer diameter point estimated in the rough outer diameter point estimation, a peripheral region of the outer diameter point is set, and an original luminance profile of this peripheral region is extracted (step S30).

Next, based on the extracted luminance profile described above, an outer diameter point (a precise outer diameter point) is estimated in a manner similar to that of the rough outer diameter point estimation described above (step S40).

Note that while steps S41 to S47 for performing precise outer diameter point estimation correspond to steps S21 to S27 for performing rough outer diameter point estimation, these estimations are different in that rough outer diameter point estimation is targeted for luminance profiles in an entire range and precise outer diameter point estimation is targeted for luminance profiles in the peripheral region of the rough outer diameter point.

Also, the noise removal process at step S45 in precise outer diameter point estimation is different from the noise removal process at step S25 in rough outer diameter point estimation in that the cutoff frequency is set higher in the former estimation. This is because, at the time of precise outer diameter point estimation, luminance profiles near the rough outer diameter point are used (information not relating to outer diameter point estimation is eliminated), and therefore noise removal is weaken.

Furthermore, the third order function approximation process at step S47 in precise outer diameter point estimation is different from third order function approximation at step S27 in rough outer diameter point estimation in that the number of samplings is set to be less than that in the estimation at step S27. This is because, by using information with a less number of samplings in the peripheral region of the rough outer diameter point at the time of precise outer diameter point estimation, a third order function approximation suitable for the second order differential profile corresponding to the periphery of the rough outer diameter point is found.

Upon precise outer diameter point estimation as described above, it is determined whether estimation processes for all outer diameter points have been completed (step S50). If the estimation processes for all outer diameter points have not been completed (in the case of "No"), the process proceeds to step S30, where another rough outer diameter point estimation and another precise outer diameter point estimation are performed. If the estimation processes for all outer diameter points have been completed (in the case of "Yes"), the process proceeds to step S52.

At step S52, the luminance profile is divided into sectors with the outer diameter point estimated in the previous stage being taken as an endpoint. For example, since two outer diameter points are present in the pipe 1, the luminance profile can be divided into three regions, that is, a region inside the two outer diameter points and regions outside the two outer diameter points.

Specifically, an intermediate position between the two estimated outer diameter points corresponds to the center position of the pipe 1. A maximum value of the luminance profile near this center position of the pipe 1 is found and, as depicted in FIG. 5, with the maximum value being taken as a threshold Th1, a luminance profile having luminance values equal to or less than this threshold Th1 is extracted. Note that the luminance profile may be extracted with a threshold (for example, a threshold Th2 of FIG. 5) smaller than the threshold Th1 and larger than 0.

Next, with the luminance profile sector-divided at step S52 as a target, inner diameter point estimation is performed on the pipe 1 (step S60).

Figure 8:
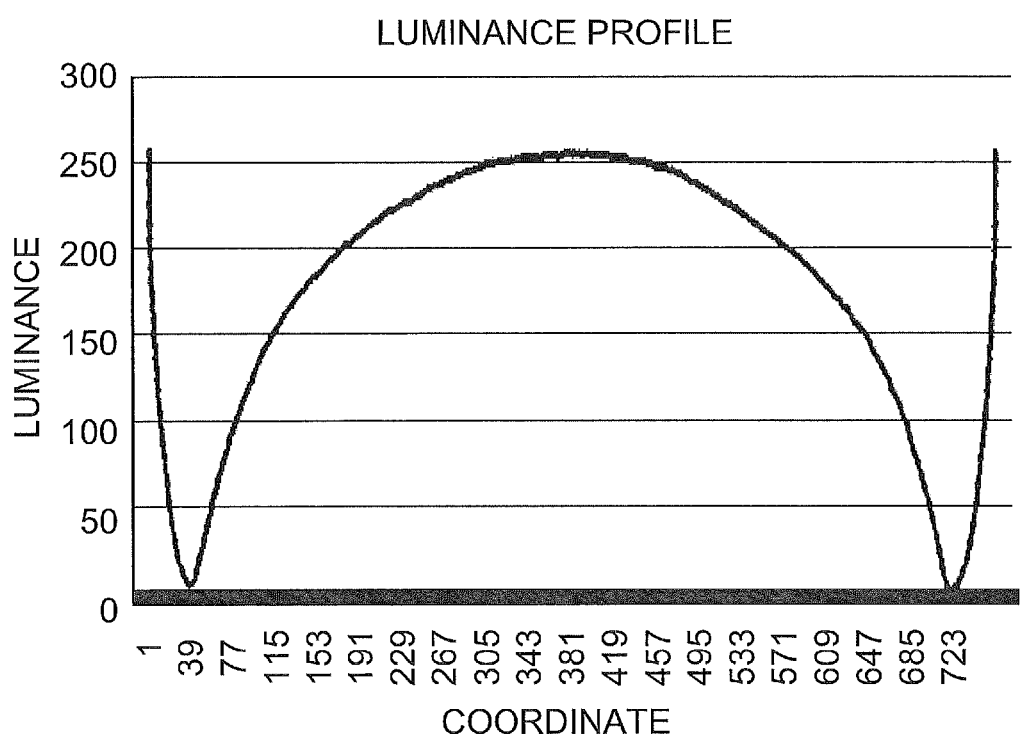
FIG. 8 is a graph depicting an example of the normalized luminance profile.

In this inner diameter point estimation, the sector-divided luminance profile is first normalized (step S61). FIG. 8 is a graph depicting an example of the normalized luminance profile.

Subsequently, a local minimum value of the normalize luminance profile is detected, and a peripheral region (a peripheral section) of that local minimum value is set (step S62). Note that X-ray absorption is the largest at the inner diameter point of the pipe 1, the luminance profile has a local minimum value at the inner diameter point.

Next, based on data of a plurality of sampling points of the luminance profile of peripheral region of the set local minimum value described above, the luminance profile is approximated with a third order function, and a coordinate position of a local minimum value of that approximated third order function is estimated as a an inner diameter point (step S63).

Upon inner diameter point estimation as described above, it is determined whether estimation processes for all inner diameter points have been completed (step S70). If the estimation processes for all inner diameter points have not been completed (in the case of "No"), the process proceeds to step S60, where another inner diameter point estimation is performed. If the estimation processes for all inner diameter points have been completed (in the case of "Yes"), the process ends.

When outer diameter point estimation and inner diameter point estimation of the pipe 1 end as described above, a difference (the number of pixels) in coordinate position between the inner diameter point and its corresponding outer diameter point is calculated. These coordination positions of the outer diameter point and the inner diameter point and their difference (corresponding to a pipe thickness) are outputted to the monitor device 30, printed out by a printer not shown, or recorded on a recording medium such as the hard disk device 20.

Note that the pipe thickness can be calculated from the number of pixels based on the actual dimensions per pixel. Also, while pipe outer diameter point estimation is performed in two stages, that is, rough outer diameter point estimation and precise outer diameter point estimation in the first embodiment, this is not meant to be restrictive, and only rough outer diameter point estimation may be performed.

<Second Embodiment>

Figure 9:
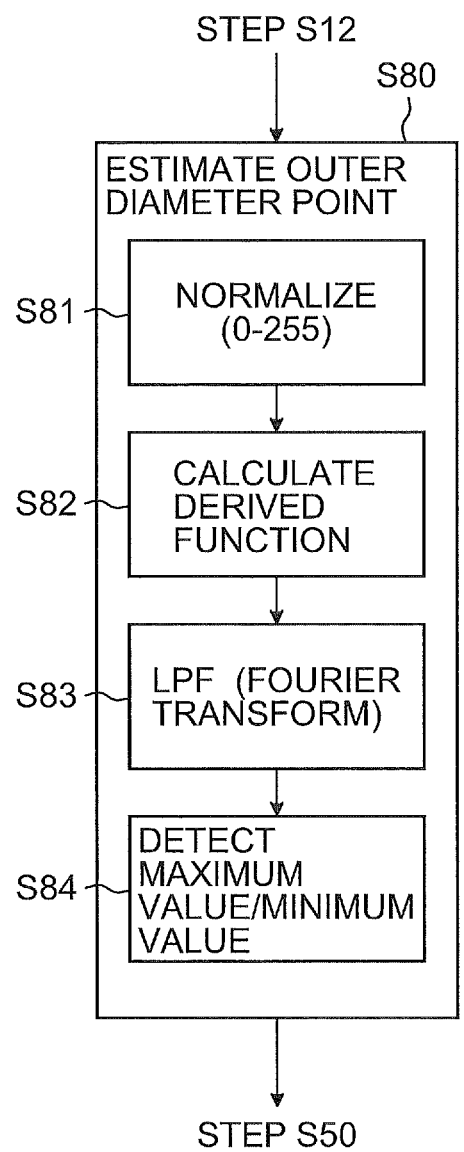
FIG. 9 is a flowchart of a second embodiment of the pipe thickness measuring process by the pipe thickness measuring device according to the present invention.

FIG. 9 is a flowchart of a second embodiment of the pipe thickness measuring process by the pipe thickness measuring device 10 according to the present invention, mainly depicting outer diameter point estimation.

The second embodiment depicted in FIG. 9 is different in that a process at step S80 is performed in place of steps S20 and S40 for performing outer diameter point estimation in the first embodiment depicted in FIG. 3.

In outer diameter point estimation of this second embodiment, the luminance profile extracted at step S12 is normalized (step S81). Subsequently, the normalized luminance profile is differentiated to calculate a derived function (a first order differential profile) (step S82).

Next, noise components are removed from the first order differential profile (step S83). The processes so far are identical to those at steps S21, S22, and S23 of the first embodiment depicted in FIG. 3.

Next, a maximum value/a minimum value of the noise-removed first order differential profile is calculated (step S84). That is, since the most abrupt change occurs in the luminance profile near the outer diameter point of the pipe 1, detecting a maximum value or a minimum value of that first order differential profile means detecting the position of the outer diameter point.

Note that when this maximum value or minimum value is detected, a first order differential profile of the peripheral region is approximated with a third order function based on data of a plurality of sampling points of the first order differential profile of the peripheral region of the maximum value, and the coordinate position of a maximum value or a minimum value of that approximated third order function is estimated as the position of the outer diameter point, thereby allowing more accurate outer diameter point estimation to be performed.

<Third Embodiment>

Figure 10:
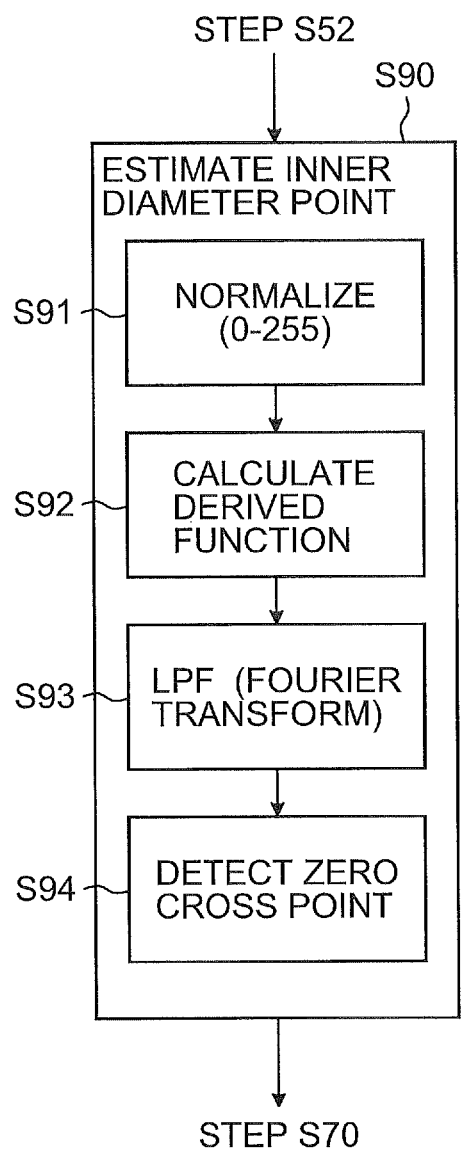
FIG. 10 is a flowchart of a third embodiment of the pipe thickness measuring process by the pipe thickness measuring device according to the present invention.

FIG. 10 is a flowchart of a third embodiment of the pipe thickness measuring process by the pipe thickness measuring device 10 according to the present invention, mainly depicting inner diameter point estimation.

The third embodiment depicted in FIG. 10 is different in that a process at step 90 is performed in place of step S60 for performing inner diameter point estimation in the first embodiment depicted in FIG. 3.

In the inner diameter point estimation of the third embodiment, the luminance profile divided into sectors at step S52 is normalized (step S91). Subsequently, the normalized luminance profile is differentiated to calculate a derived function (a first order differential profile) (step S92), and noise components are removed from this first order differential profile by an LPF (step S93).

Figure 11:
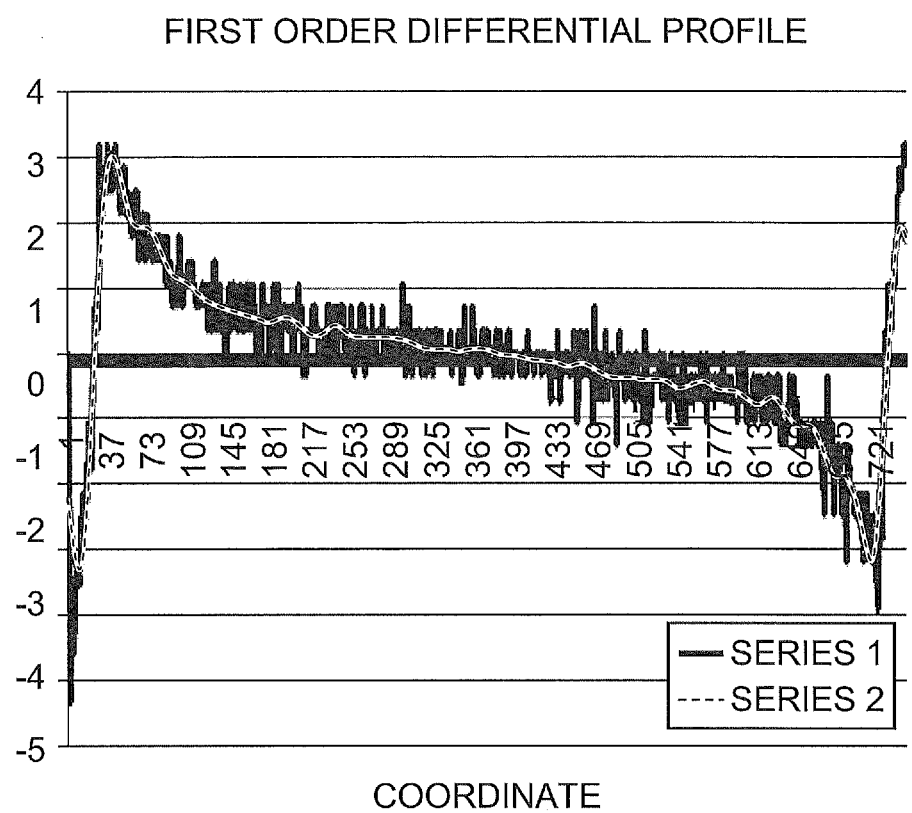
FIG. 11 is a graph depicting an example of a first order differential profile before noise removal (Series 1) and a first order differential profile after noise removal (Series 2).

FIG. 11 is a graph depicting an example of the first order differential profile before noise removal (Series 1) and a first order differential profile after noise removal (Series 2).

Next, a zero cross point of the noise-removed first order differential profile is detected (step S94). The coordinate position of this zero cross point can be estimated as the position of the inner diameter point of the pipe 11.

Note that a peripheral region (a zero cross region) of the zero cross point is set, a first order differential profile of the zero cross region is approximated with a third order function based on data of a plurality of sampling points of the first order differential profile of the zero cross region, and the coordinate position of a zero cross point of this third order function is estimated as the position of the inner diameter point, thereby allowing more accurate inner diameter point estimation to be performed.

<Fourth Embodiment>

Figure 12:
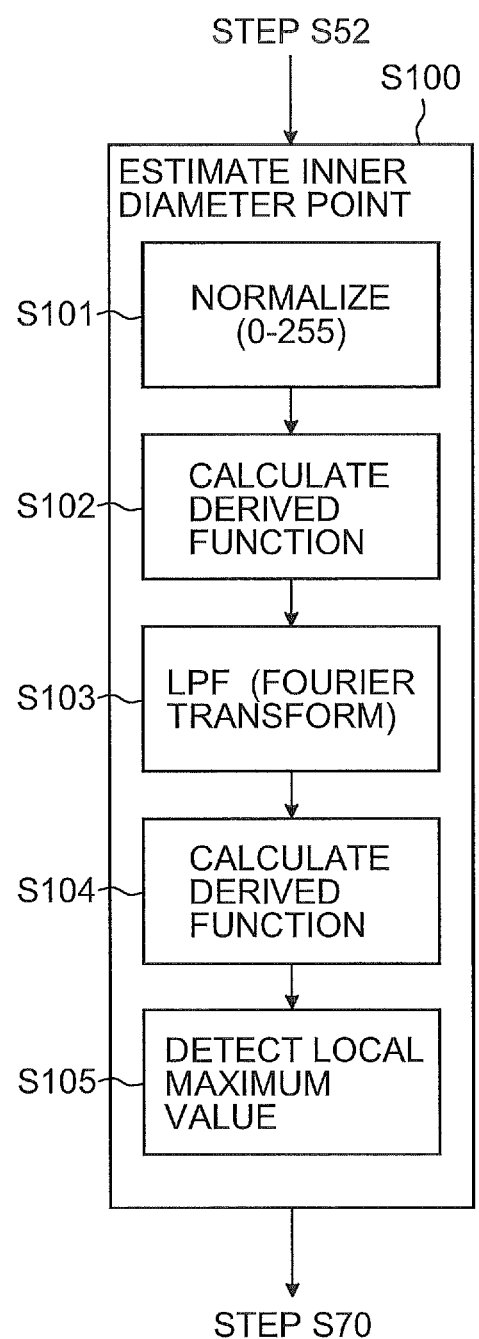
FIG. 12 is a flowchart of a fourth embodiment of the pipe thickness measuring process by the pipe thickness measuring device according to the present invention.

FIG. 12 is a flowchart of a fourth embodiment of the pipe thickness measuring process by the pipe thickness measuring device 10 according to the present invention, mainly depicting inner diameter point estimation.

The fourth embodiment depicted in FIG. 12 is different in that a process at step 100 is performed in place of step S60 for performing inner diameter point estimation in the first embodiment depicted in FIG. 3.

Processes at steps S101 to S103 of the fourth embodiment depicted in FIG. 12 are identical to the processes at steps S91 to S93 of the third embodiment depicted in FIG. 10, and therefore are not described in detail herein.

Figure 13:
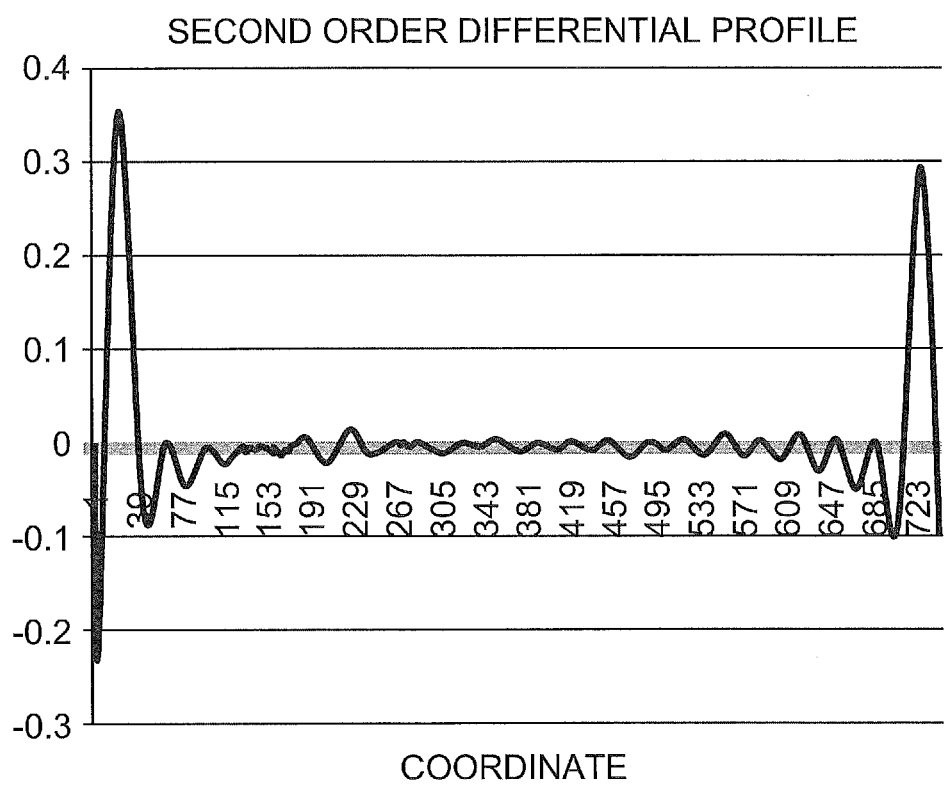
FIG. 13 is a graph depicting an example of a second order differential profile.
Figure 14A:
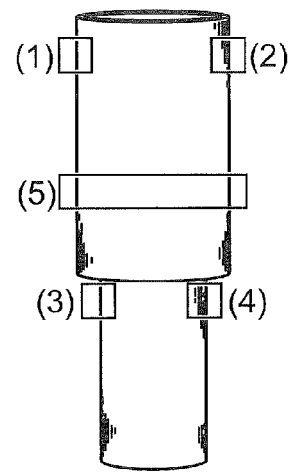
FIG. 14A is a drawing of an example of an evaluation image (No. 1).
Figure 14B:
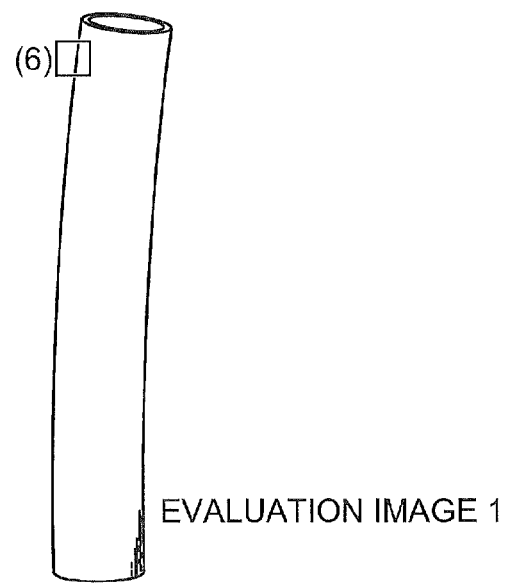
FIG. 14B is a drawing of an example of an evaluation image (No. 2).
Figure 14C:
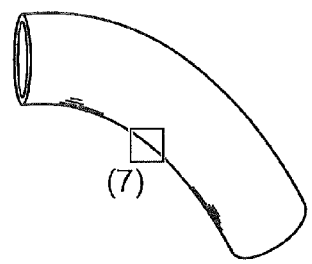
FIG. 14C is a drawing of an example of an evaluation image (No. 3).
Figure 14D:
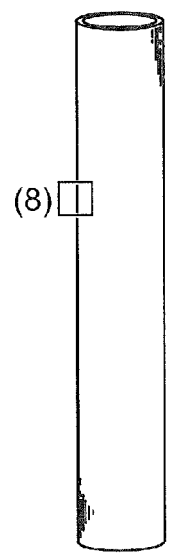
FIG. 14D is a drawing of an example of an evaluation image (No. 4).

At step S104 of the fourth embodiment, the first order differential profile after noise removal processed at step S103 is further differentiated to calculate a derived function (a second order differential profile). FIG. 13 is a graph depicting an example of the second order differential profile described above.

Subsequently, a local maximum value of the second order differential profile described above is detected (step S105).

The coordinate position of this local maximum value can be estimated as the position of the inner diameter point of the pipe 11.

In addition, by setting a peripheral region of the local maximum value, approximating a second order differential profile of the peripheral region with a third order function based on data of a plurality of sampling points of the second order differential profile of this peripheral region, and estimating the coordinate position of a local maximum value of this third order function as the position of the inner diameter point, more accurate inner diameter point estimation can be performed.

EXAMPLES

By using Evaluation Images 0 to 3 depicted in FIG. 14A to FIG. 14D, performance evaluation of the pipe thickness measuring method of the first embodiment was conducted.

Relations between each of Evaluation Images 0 to 3 and the measured regions (Regions (1) to (8)) are shown in FIG. 15.

To measure the performance of the present pipe thickness measurement algorithm in view of stability, the following experiments were performed. Experiment results are also shown below.

(1) Line-segment Designation Dependency

A measurement line is specified (designated) with starting point coordinates and end point coordinates of a line segment. Here, as depicted in FIG. 16, with the starting point coordinates being fixed, the end point coordinates were moved in a direction parallel to the wall surface of the pipe, and each candidate point (outer diameter point and inner diameter point) and changes in thickness were observed.

Tables in FIG. 17 to FIG. 20 show measurement results.

As shown in the tables of FIG. 17 to FIG. 20, in both of rough outer diameter point estimation (global estimation) and global+local estimation (precise outer diameter estimation) of the pipe, stable estimation results were obtained.

However, in the case of global estimation, some cases of inviting a large error were observed.

(2) Selection-range Dependency

A measurement line is specified with starting point coordinates and end point coordinates of a line segment. Here, as depicted in FIG. 21, with the starting point coordinates being fixed, the end point coordinates were moved in a direction parallel to a section of the pipe, and each candidate point, changes in thickness, and selection-range dependency were observed.

Note that, although arrows in FIG. 21 actually overlap each other (because their Y-axis coordinates are identical), they are shown with their Y-axis coordinates shifted on purpose for ease of understanding.

A table in FIG. 22 shows measurement results.

As shown in the table of FIG. 22, it can be seen that fluctuations in the measurement results in global estimation is improved in global+local estimation.

(3) Position Dependency

A measurement line is specified with starting point coordinates and end point coordinates of a line segment. Here, as depicted in FIG. 23, both of the starting point coordinates and the end point coordinates were moved in a direction parallel to the wall surface of the pipe, and each candidate point, changes in thickness, and measurement position dependency were observed.

Tables in FIG. 24 to FIG. 27 show measurement results.

As with the line-segment designation dependency test, stable estimation results were shown in both of the cases of global estimation and global+local estimation. In the case of global estimation, however, some cases of inviting a large error were observed.

Also, to support a noisy image in the course of the test, the cutoff frequency is changed from initial 50 Hz to 30 Hz in the LPF process at the time of detecting an outer diameter point.

[Others]

The present invention may be configured by combining any of the first embodiment to the fourth embodiment as appropriate. Also, while a third order function is used as a function for approximating various profiles in the first embodiment and others, the present invention is not restricted to this, and a second order function may be used.

Also, a program for causing a computer to achieve the pipe thickness measuring method according to the present invention may be stored in a recording medium. The program can be read from this recording medium and be installed on the computer. Then, this computer is caused to execute the program. Here, the storage medium having the program described above stored therein may be a non-transitory recording medium. The non-transitory recording medium is not particularly restrictive, and may be, for example, a recording medium such as a CD-ROM.

Furthermore, the present invention is not restricted to the embodiments described above, and it goes without saying that various modifications can be made within a range not deviating from the spirit of the present invention.

What is claimed is:

1. A pipe thickness measuring device comprising:
   a luminance profile obtaining unit which obtains luminance profiles in a direction crossing a pipe to be measured from radiographic images of the pipe;
   an outer diameter point detecting unit which detects outer diameter points of the pipe based on the obtained luminance profiles;
   a region setting unit which sets a predeteimined region inside two of the outer diameter points of the pipe detected by the outer diameter point detecting unit; and
   an inner diameter point detecting unit which detects inner diameter points of the pipe based on a luminance profile corresponding to the set predetermined region from among the luminance profiles obtained by the luminance profile obtaining unit,
   wherein the outer diameter point detecting unit includes
   a normalizing unit which normalizes the luminance profile obtained by the luminance profile obtaining unit,
   a first order differential profile calculating unit which calculates a first order differential profile by first order differentiating the normalized luminance profile,
   a noise removing unit which removes noise components from the first order differential profile,
   a second order differential profile calculating unit which calculates a second order differential profile by differentiating the first order differential profile from which the noise components are removed,
   a zero cross region setting unit which detects a zero cross point of the calculated second order differential profile and sets a zero cross region near the zero cross point,
   an approximate curve calculating unit which calculates an approximate curve by approximating a second order differential profile of the set zero cross region with a predetermined function, and
   a detecting unit which detects the outer diameter points each based on a zero cross point of the calculated approximate curve.

2. A pipe thickness measuring device comprising:

a luminance profile obtaining unit which obtains luminance profiles in a direction crossing a pipe to be measured from radiographic images of the pipe;

an outer diameter point detecting unit which detects outer diameter points of the pipe based on the obtained luminance profiles;

a region setting unit which sets a predetermined region inside two of the outer diameter points of the pipe detected by the outer diameter point detecting unit; and an inner diameter point detecting unit which detects inner diameter points of the pipe based on a luminance profile corresponding to the set predetermined region from among the luminance profiles obtained by the luminance profile obtaining unit, wherein the outer diameter point detecting unit includes a first normalizing unit which normalizes the luminance profile obtained by the luminance profile obtaining unit, a first first-order differential profile calculating unit which calculates a first order differential profile by first order differentiating the normalized luminance profile, a first noise removing unit which removes noise components from the first order differential profile, a first second-order differential profile calculating unit which calculates a second order differential profile by differentiating the first order differential profile from which the noise components are removed, a first zero cross region setting unit which detects a zero cross point of the calculated second order differential profile and sets a zero cross region near the zero cross point, a first approximate curve calculating unit which calculates an approximate curve by approximating a second order differential profile of the set zero cross region with a predetermined function, a first detecting unit which detects a rough outer diameter point based on a zero cross point of the calculated approximate curve, an extracting unit which extracts a luminance profile near the detected rough outer diameter point among the luminance profiles obtained by the luminance profile obtaining unit, a second normalizing unit which normalizes the extracted luminance profile, a second first-order differential profile calculating unit calculates a first order differential profile by first order differentiating the normalized luminance profile, a second noise removing unit which removes noise components from the first order differential profile, a second second-order differential profile calculating unit which calculates a second order differential profile by differentiating the first order differential profile from which the noise components are removed, a second zero cross region setting unit which detects a zero cross point of the calculated second order differential profile and sets a zero cross region near the zero cross point, a second approximate curve calculating unit which calculates an approximate curve by approximating a second order differential profile of the set zero cross region with a predetermined function, and a second detecting unit which detects a precise outer diameter point based on a zero cross point of the calculated approximate curve.

3. The pipe thickness measuring device according to claim 2, wherein the second noise removing unit has a cutoff frequency higher than a cutoff frequency of the first noise removing unit.

4. The pipe thickness measuring device according to claim 2, wherein the first approximate curve calculating unit and the second approximate curve calculating unit calculates the first approximate curve and the second approximate curve by using data of each predetermined number of samplings from each corresponding second order differential profile, and a number of samplings in the second approximate curve calculating unit is smaller than a number of samplings in the first approximate curve calculating unit.

5. The pipe thickness measuring device according to claim 1, wherein the region setting unit sets the predetermined region based on a predetermined threshold larger than a minimum luminance value of the luminance profile and equal to or less than a luminance value at an approximately center of the pipe.

6. The pipe thickness measuring device according to claim 1, wherein the inner diameter point detecting unit includes:

an extracting unit which extracts a predetermined section including a local minimum value of the luminance profile corresponding to the predetermined region set by the region setting unit, an approximate curve calculating unit which calculates an approximate curve by approximating a luminance profile in the extracted section with a predetermined function, and a detecting unit which detects the inner diameter points of the pipe based on a local minimum value of the calculated approximate curve.

7. A pipe thickness measuring device comprising:

a luminance profile obtaining unit which obtains luminance profiles in a direction crossing a pipe to be measured from radiographic images of the pipe;

an outer diameter point detecting unit which detects outer diameter points of the pipe based on the obtained luminance profiles;

a region setting unit which sets a predetermined region inside two of the outer diameter points of the pipe detected by the outer diameter point detecting unit; and an inner diameter point detecting unit which detects inner diameter points of the pipe based on a luminance profile corresponding to the set predetermined region from among the luminance profiles obtained by the luminance profile obtaining unit, wherein the inner diameter point detecting unit includes a normalizing unit which normalizes a luminance profile corresponding to the predetermined region set by the region setting unit, an extracting unit which extracts a predetermined section including a local minimum value of the normalized luminance profile, an approximate curve calculating unit which calculates an approximate curve by approximating a luminance profile in the extracted section with a predetermined function, and a detecting unit which detects the inner diameter points of the pipe based on a local minimum value of the calculated approximate curve.

8. A pipe thickness measuring device comprising:

a luminance profile obtaining unit which obtains luminance profiles in a direction crossing a pipe to be measured from radiographic images of the pipe;

an outer diameter point detecting unit which detects outer diameter points of the pipe based on the obtained luminance profiles;

a region setting unit which sets a predetermined region inside two of the outer diameter points of the pipe detected by the outer diameter point detecting unit; and an inner diameter point detecting unit which detects inner diameter points of the pipe based on a luminance profile corresponding to the set predetermined region from among the luminance profiles obtained by the luminance profile obtaining unit, wherein the inner diameter point detecting unit includes a normalizing unit which normalizes a luminance profile corresponding to the predetermined region set by the region setting unit, a first order differential profile calculating unit which calculates a first order differential profile by first order differentiating the normalized luminance profile, a first noise removing unit which removes noise components from the first order differential profile, an extracting unit which extracts a predetermined section including a zero cross point of the first order differential profile from which the noise components are removed, an approximate curve calculating unit which calculates an approximate curve by approximating a first order differential profile in the extracted section with a predetermined function, and a detecting unit which detects the inner diameter points of the pipe based on a zero cross point of the calculated approximate curve.

9. A pipe thickness measuring device comprising:

a luminance profile obtaining unit which obtains luminance profiles in a direction crossing a pipe to be measured from radiographic images of the pipe;

an outer diameter point detecting unit which detects outer diameter points of the pipe based on the obtained luminance profiles;

a region setting unit which sets a predetermined region inside two of the outer diameter points of the pipe detected by the outer diameter point detecting unit; and an inner diameter point detecting unit which detects inner diameter points of the pipe based on a luminance profile corresponding to the set predetermined region from among the luminance profiles obtained by the luminance profile obtaining unit, and wherein the inner diameter point detecting unit includes a normalizing unit which normalizes a luminance profile corresponding to the predetermined region set by the region setting unit, a first order differential profile calculating unit which calculates a first order differential profile by first order differentiating the normalized luminance profile, a noise removing unit which removes noise components from the first order differential profile, a second order differential profile calculating unit which calculates a second order differential profile by differentiating the first order differential profile from which the noise components are removed, an extracting unit which extracts a predetermined section including a local maximum value of the calculated second order differential profile, an approximate curve calculating unit which calculates an approximate curve by approximating a second order differential profile in the extracted section with a predetermined function, and a detecting unit which detects the inner diameter points of the pipe based on a local maximum value of the calculated approximate curve.

10. The pipe thickness measuring device according to claim 1, wherein the predetermined function comprises a second order function or a third order function.

11. The pipe thickness measuring device according to claim 1, comprising:

a measuring unit which measures the pipe thickness based on a difference between one of the outer diameter points of the pipe detected by the outer diameter point detecting unit and one of the inner diameter points detected by the inner diameter point detecting unit, the inner diameter point corresponding to the outer diameter point, and an output unit which outputs the measurement results.

12. A pipe thickness measuring method, comprising:

obtaining luminance profiles in a direction crossing a pipe to be measured from radiographic images of the pipe;

calculating a first order differential profile by first order differentiating one of the obtained luminance profiles or a second order differential profile by second order differentiating the luminance profile;

detecting outer diameter points of the pipe based on a maximum value or a minimum value of the calculated first order differential profile, or based on a zero cross point of the second order differential profile;

setting a predetermined region inside two of the detected outer diameter points of the pipe; and detecting step of detecting inner diameter points of the pipe based on a minimum value of a luminance profile corresponding to the set predetermined region from among the luminance profiles obtained in the luminance profile obtaining step, or a zero cross point of a first order differential profile obtained by first order differentiating the luminance file, or a maximum value of a second order differential profiled obtained by second order differentiating the luminance file, wherein the detecting outer diameter points of the pipe includes:

normalizing the luminance profile obtained by the obtaining luminance profiles, calculating a first order differential profile by first order differentiating the normalized luminance profile, removing noise components from the first order differential profile, calculating a second order differential profile by differentiating the first order differential profile from which the noise components are removed, detecting a zero cross point of the calculated second order differential profile and setting a zero cross region near the zero cross point, calculating an approximate curve by approximating a second order differential profile of the set zero cross region with a predetermined function, and detecting the outer diameter points each based on a zero cross point of the calculated approximate curve.

13. A non-transitory computer-readable recording medium having a program recorded thereon, the program causing a computer to execute procedures comprising:

obtaining luminance profiles in a direction crossing a pipe to be measured from radiographic images of the pipe;

calculating a first order differential profile by first order differentiating a relevant one of the obtained luminance profiles or a second order differential profile by second order differentiating the luminance profile;

detecting outer diameter points of the pipe based on a maximum value or a minimum value of the calculated first order differential profile, or a zero cross point of the second order differential profile;

setting a predetermined region inside two of the detected outer diameter points of the pipe; and detecting inner diameter points of the pipe based on a minimum value of a luminance profile corresponding to the set predetermined region from among the luminance profiles obtained in the luminance profile obtaining step, or a zero cross point of a first order differential profile obtained by first order differentiating the luminance file, or a maximum value of a second order differential profile obtained by second order differentiating the luminance file, wherein the detecting outer diameter points of the pipe includes:

normalizing the luminance profile obtained by the obtaining luminance profiles, calculating a first order differential profile by first order differentiating the normalized luminance profile, removing noise components from the first order differential profile, calculating a second order differential profile by differentiating the first order differential profile from which the noise components are removed, detecting a zero cross point of the calculated second order differential profile and setting a zero cross region near the zero cross point, calculating an approximate curve by approximating a second order differential profile of the set zero cross region with a predetermined function, and detecting the outer diameter points each based on a zero cross point of the calculated approximate curve.

14. A pipe thickness measuring method, comprising:

obtaining luminance profiles in a direction crossing a pipe to be measured from radiographic images of the pipe;

calculating a first order differential profile by first order differentiating one of the obtained luminance profiles or a second order differential profile by second order differentiating the luminance profile;

detecting outer diameter points of the pipe based on a maximum value or a minimum value of the calculated first order differential profile, or based on a zero cross point of the second order differential profile;

setting a predetermined region inside two of the detected outer diameter points of the pipe; and detecting inner diameter points of the pipe based on a minimum value of a luminance profile corresponding to the set predetermined region from among the luminance profiles obtained in the luminance profile obtaining step, or a zero cross point of a first order differential profile obtained by first order differentiating the luminance file, or a maximum value of a second order differential profiled obtained by second order differentiating the luminance file, wherein the detecting inner diameter points of the pipe includes:

normalizing a luminance profile corresponding to the predetermined region set by the setting of the predetermined region, extracting a predetermined section including a local minimum value of the normalized luminance profile, calculating an approximate curve by approximating a luminance profile in the extracted section with a predetermined function, and detecting the inner diameter points of the pipe based on a local minimum value of the calculated approximate curve.

15. A non-transitory computer-readable recording medium having a program recorded thereon, the program causing a computer to execute procedures comprising:

obtaining luminance profiles in a direction crossing a pipe to be measured from radiographic images of the pipe;

calculating a first order differential profile by first order differentiating a relevant one of the obtained luminance profiles or a second order differential profile by second order differentiating the luminance profile;

detecting outer diameter points of the pipe based on a maximum value or a minimum value of the calculated first order differential profile, or a zero cross point of the second order differential profile;

setting a predetermined region inside two of the detected outer diameter points of the pipe; and detecting inner diameter points of the pipe based on a minimum value of a luminance profile corresponding to the set predetermined region from among the luminance profiles obtained in the luminance profile obtaining step, or a zero cross point of a first order differential profile obtained by first order differentiating the luminance file, or a maximum value of a second order differential profile obtained by second order differentiating the luminance file, wherein the detecting inner diameter points of the pipe includes:

normalizing a luminance profile corresponding to the predetermined region set by the setting of the predetermined region, extracting a predetermined section including a local minimum value of the normalized luminance profile, calculating an approximate curve by approximating a luminance profile in the extracted section with a predetermined function, and detecting the inner diameter points of the pipe based on a local minimum value of the calculated approximate curve.

* * * * *